(12) United States Patent
Brocchini et al.

(10) Patent No.: US 6,828,412 B1
(45) Date of Patent: Dec. 7, 2004

(54) DEGRADABLE POLYMERS

(75) Inventors: Stephen James Brocchini, London (GB); Marie-Claude Dubois Clochard, London (GB)

(73) Assignee: School of Pharmacy, University of London, London (GB)

( * ) Notice: Subject to any disclaimer, the term of this patent is extended or adjusted under 35 U.S.C. 154(b) by 45 days.

(21) Appl. No.: 10/069,929

(22) PCT Filed: Sep. 1, 2000

(86) PCT No.: PCT/US00/24232

§ 371 (c)(1),
(2), (4) Date: Jul. 19, 2002

(87) PCT Pub. No.: WO01/17515

PCT Pub. Date: Mar. 15, 2001

(30) Foreign Application Priority Data

Sep. 3, 1999 (EP) ............................................. 99307041

(51) Int. Cl.$^7$ ........................ C08G 69/00; C08G 69/48; C08F 283/00; A61K 31/00; C08L 89/00

(52) U.S. Cl. ........................ 528/310; 528/322; 528/327; 528/328; 528/341; 528/342; 528/345; 528/354; 528/360; 528/363; 528/364; 528/373; 525/54.1; 525/54.2; 525/408; 525/411; 525/415; 424/78.08; 424/78.17; 424/78.19; 424/78.22; 424/484; 424/486

(58) Field of Search ................................. 528/310, 322, 528/327, 328, 341, 342, 345, 354, 360, 363, 364, 373, 312–315; 525/54.1, 54.2, 408, 411, 415, 420–422; 424/78.08, 78.19, 78.22, 70.11, 70.17, 484, 486; 524/27, 56

(56) References Cited

U.S. PATENT DOCUMENTS

| | | | | | |
|---|---|---|---|---|---|
| 3,846,380 | A | * | 11/1974 | Fujimoto et al. | ......... 525/328.2 |
| 4,745,161 | A | * | 5/1988 | Saudek et al. | ............... 525/420 |
| 5,462,990 | A | * | 10/1995 | Hubbell et al. | ............. 525/54.1 |
| 5,686,066 | A | * | 11/1997 | Harada et al. | ............ 424/70.14 |
| 5,817,742 | A | * | 10/1998 | Toepfer et al. | .............. 528/328 |
| 5,877,224 | A | * | 3/1999 | Brocchini et al. | ........ 514/772.2 |
| 5,898,033 | A | * | 4/1999 | Swadesh et al. | .......... 514/224.2 |
| 5,902,812 | A | * | 5/1999 | Brocchini et al. | ...... 514/254.08 |
| 5,929,198 | A | * | 7/1999 | Tang | ........................... 528/288 |
| 5,935,955 | A | * | 8/1999 | Ashworth et al. | ........ 514/235.8 |
| 6,111,057 | A | * | 8/2000 | Mohr et al. | ................... 528/328 |
| 6,127,515 | A | * | 10/2000 | Manfre et al. | ............... 528/367 |
| 6,238,687 | B1 | * | 5/2001 | Mao et al. | .................... 424/426 |
| 6,362,276 | B1 | * | 3/2002 | Harris et al. | ................ 525/54.1 |
| 6,664,331 | B2 | * | 12/2003 | Harris et al. | ................ 525/54.1 |
| 6,677,431 | B2 | * | 1/2004 | DeGrado et al. | ............ 530/326 |
| 6,689,350 | B2 | * | 2/2004 | Uhrich | ..................... 424/78.17 |

* cited by examiner

*Primary Examiner*—P. Hampton Hightower
(74) *Attorney, Agent, or Firm*—Dickstein, Shapiro, Morin & Oshinsky, LLP.

(57) ABSTRACT

A polymer comprising: a polymeric backbone comprising at least one unit having the structure (I), wherein $R$–$R^4$ comprise groups selected from the group consisting of H, $C_1$–$C_{12}$ alkyl, $C_6$–$C_{18}$ aryl, $C_7$–$C_{18}$ aralkyl, $C_6$–$C_{18}$ cycloalkyl or any of the group consisting of $C_1$–$C_{12}$ alkyl, $C_6$–$C_{18}$ aryl, $C_7$–$C_{18}$ aralkyl, $C_6$–$C_{18}$ cycloalkyl substituted, within the carbon chain or appended thereto, with one or more heteroatoms; R and $R^2$ or R and $R^4$ or R and $R^1$ or $R^2$ and $R^3$ may be joined so that with the carbon atom(s) to which they are attached they together form a saturated, partially unsaturated or unsaturated ring system respectively, may have a pendent group which may incorporate a linker unit, (for example a peptide linkage) or a unit having the structure (I); A comprises a proton donating moiety selected from the group consisting of formula (1). B comprises a hydrolytically labile group and is selected from the group consisting of formula (2), wherein each $R^5$ is individually selected from the group consisting of H, $C_1$–$C_{12}$ alkyl, $C_6$–$C_{18}$ aryl, $C_7$–$C_{18}$ aralkyl, $C_6$–$C_{18}$ cycloalkyl; wherein groups A and B are in a cis-configuration about bond $C_a$—$C_b$; m is an integer of 0 to 100, n, p and q are each an integer of 0 or 1; Q comprises 1 or more structures selected from the group consisting of formula (3) wherein $R^6$–$R^{11}$ are individually selected from the same group as defined for group R above and r is an integer between 1 and 5000, preferably 1 to 10, most preferably 1 to 6; methods for the production, and uses thereof.

33 Claims, 3 Drawing Sheets

DEGRADABLE POLYMERS

The present invention is concerned with degradable polymers and the production of materials therefrom. These polymers and materials find utility in polymer therapeutics and pharmaceutical compositions for the treatment of disease.

BACKGROUND OF THE INVENTION

Polymer Therapeutics (Duncan R., Polymer therapeutics for tumour specific delivery Chem & Ind 1997, 7, 262–264) are developed for biomedical applications requiring physiologically soluble polymers and include biologically active polymers, polymer-drug conjugates, polymer-protein conjugates, and other covalent constructs of bioactive molecules. An exemplary class of a polymer-drug conjugate is derived from copolymers of hydroxypropyl methacrylamide (HPMA) which have been extensively studied for the conjugation of cytotoxic drugs for cancer chemotherapy (Duncan R: Drug-polymer conjugates: potential for improved chemotherapy. Anti-Cancer Drugs, 1992, 3, 175–210. Putnam D, Kopecek J: Polymer conjugates with anticancer activity. Adv. Polym. Sci., 1995, 122, 55–123. Duncan R, Dimitrijevic S, Evagorou E: The role of polymer conjugates in the diagnosis and treatment of cancer. STP Pharma, 1996, 6, 237–263). An HPMA copolymer conjugated to doxorubicin known as PK-1, is currently in Phase II evaluation in the UK. PK-1 displayed reduced toxicity compared to free doxorubicin in the Phase I studies (Vasey P, Twelves C, Kaye S, Wilson P, Morrison R, Duncan R, Thomson A, Hilditch T, Murray T, Burtles S, Cassidy J: Phase I clinical and pharmacokinetic study of PKI (HPMA copolymer doxorubicin): first member of a new class of chemotherapeutic agents: drug-polymer conjugates. Clin. Cancer Res., 1999, 5, 83–94). The maximum tolerated dose of PK-1 was 320 mg/m$^2$ which is 4–5 times higher than the usual clinical dose of free doxorubicin.

The polymers used to develop Polymer Therapeutics may also be separately developed for other biomedical applications where the polymer can form aggregates such as polymeric micelles and complexes. Another important set of medical applications include those that require the polymer be used as a material, rather than as a physiologically soluble molecule. Thus, drug release matrices (including microspheres and nanoparticles), hydrogels (including injectable gels and viscious solutions) and hybrid systems (e.g. liposomes with conjugated poly(ethylene glycol) (PEG) on the outer surface) and devices (including rods, pellets, capsules, films, gels) can be fabricated for tissue or site specific drug delivery. Polymers are also clinically widely used as excipients in drug formulation. Within these three broad application areas: (1) physiologically soluble molecules, (2) materials and (3) excipients, biomedical polymers provide a broad technology platform for optimising the efficacy of an active therapeutic drug.

Covalent conjugation of a drug to a soluble, biocompatible polymer can result in improved efficacy of the drug. Compared to the free, unconjugated drug, polymer-drug conjugates exhibit this improvement for the following main reasons: (1) altered biodistribution, (2) prolonged circulation, (3) release of the drug in the proteolytic and acidic environment of the secondary lysosome after cellular uptake of the conjugate by pinocytosis and (4) more favourable physicochemical properties imparted to the drug due to the characteristics of large molecules (e.g. increased drug solubility in biological fluids).

For the treatment of cancer there are marked improvements in therapeutic efficacy and site specific passive capture through the enhanced permeability and retention (EPR) effect. The EPR effect results from enhanced permeability of macromolecules or small particles within the tumour neovasculature due to leakiness of its discontinuous endothelium. In addition to the tumour angiogenesis (hypervasculature) and irregular and incompleteness of vascular networks, the attendant lack of lymphatic drainage promotes accumulation of macromolecules that extravasate. This effect is observed in many solid tumours for macromolecular agents and lipids. The enhanced vascular permeability will support the great demand of nutrients and oxygen for the rapid growth of the tumour. Unless specifically addressed for tumour cell uptake by receptor-medicated endocytosis, polymers entering the intratumoural environment are taken up relatively slowly by fluid-phase pinocytosis.

An increasing number of physiologically soluble polymers have been used as macromolecular partners for the conjugation of bioactive molecules. Many polymers have the disadvantage of being non-degradable in the polymer mainchain. For example, PEG (Monfardini C, Veronese F: Stabilization of substances in circulation. Bioconjugate Chem., 1998, 9, 418–450. Zalipsky S: Chemistry of poly-ethylene glycol conjugates with biologically active molecules. Adv. Drug Delivery Rev., 1995, 16, 157–182. Delgado C, Francis G, Fisher D: The uses and properties of PEG-liked proteins. Crit. Rev. Ther. Drug Carrier Syst., 1992, 9, 249–304. Nucci M L, Shorr D, Abuchowski A: The therapeutic values of poly(ethylene glycol)-modified proteins. Adv. Drug Delivery Rev., 1991, 6, 133–151. Nathan A, Zalipsky S, Ertel S, Agathos S, Yarmush M, Kohn J: Copolymers of lysine and polyethylene glycol: A new family of functionalized drug carriers. Bioconjugate Chem., 1993, 4, 54–62) and HPMA (Putnam D, Kopecek J: Polymer conjugates with anticancer activity. Adv Polym. Sci., 1995, 122, 55–123. Duncan R, Dimitrijevic S, Evagorou E: The role of polymer conjugates in the diagnosis and treatment of cancer. STP Pharma, 1996, 6, 237–263) copolymers have been extensively studied for conjugation. PEG is also generally used in the pharmaceutical industry as a formulation excipient. These hydrophilic polymers are soluble in physiological media, but their main disadvantage is that the polymer mainchain does not degrade in vivo. Thus it is not possible to prohibit accumulation of these polymers in the body. Only polymers with a molecular weight lower than the renal threshold can be used for systemic administration. It is imperative that for the systemic use of non-degradable polymers such as HPMA and PEG only molecules of a molecular weight which are readily cleared be administered or else long-term deleterious accumulation in healthy tissue will invariably result (Seymour L, Duncan R, Strohalm J, Kopecek J: Effect of molecular weight (Mw) of N-(2-hydroxypropyl)methacrylamide copolymers on body distributions and rate of excretion after subcutaneous, intraperitoneal and intravenous administration to rats. J. Biomed. Mater. Res., 1987, 21, 1341–1358. Schneider P, Korolenko T, Busch U: A review of drug-induced lysosomal disorders of the liver in man and laboratory animals. Microscopy Res. Tech., 1997, 36, 253–275. Hall C, Hall O: Experimental hypertension elicited by injections of methyl cellulose. Experientia, 1961, 17, 544–454. Hall C, Hall O: Macromolecular hypertension: hypertensive cardiovascular disease from subcutaneously administered polyvinyl alcohol. Experientia, 1962, 18, 38–40).

Although some natural polymers such as polysaccharides have the advantage of being degradable in vivo, e.g. dextran, they typically lack a strict structural uniformity and have the propensity upon chemical modification (i.e. conjugation of a bioactive molecule) to become immunogenic or non-degradable (Vercauteren J, Bruneel D, Schacht E, Duncan R: Effect of the chemical modification of dextran on the degradation by dextranases. *J. Bio. Comp. Polymers*, 1990, 5, 4–15. Shalaby W, Park K: Chemical modification of proteins and polysaccharides and its effect on enzyme-catalysed degradation. In: Shalaby S, ed. Biomedical Polymers. Designed-to-degrade systems. New York: Hanser Publishers, 1994). Other polysaccharides which have been investigated for biomedical conjugation applications include chitosan (Ohya Y, Huang T, Ouchi T, Hasegawa K, Tamura J, Kadowaki K, Matsumoto T, Suzuki S: a-1,4-Polygalactosamine immobilised 5-fluorouracils through hexamethylene spacer groups via urea bonds. *J. Cont. Rel.*, 1991, 17, 259–266), alginate (Al-Shamkhani A, Duncan R: Synthesis, controlled release properties and antitumour activity of alginate cis-aconityl daunomycin conjugates. *Int. J. Pharm.*, 1995, 122, 107–119. Morgan S, Al-Shamkhani A, Callant D, Schacht E, Woodley J, Duncan R: Alginates as drug carriers: covalent attachment of alginates to therapeutic agents containing primary amine groups. *Int. J. Pharm.*, 1995, 122, 121–128), hyaluronic acid (Schechter B, Neumann A, Wilchek M, Amon R: Soluble polymers as carriers of cisplatinum. *J. Cont. Rel.*, 1989, 10, 75–87), 6-O-carboxymethyl chitan (Ohya Y, Nonomura K, Ouchi T: In vivo and in vitro antitumor activity of CM-Chitin immobilized doxorubicins by lysosomal digestible tetrapeptide spacer groups. *J. Bioact. Compat. Polymers*, 1995, 10, 223–234) and 6-O-carboxymethyl pullulan (Nogusa H, Yano T, Okuno S, Hamana H, Inoue K: Synthesis of carboxymethylpullulan peptide doxorubicin conjugates and their properties. *Chem. Pharm. Bull.*, 1995, 43, 1931–1936).

Other natural polymers such as proteins can also be used to conjugate a bioactive molecule. For example albumin has been investigated as a protein used to conjugate a bioactive molecule (Balboni P, Minia A, Grossi M, Barbanti-Brodano G, Mattioli A, Flume L: Activity of albumin conjugates of 5-fluorodeoxyuridine and cytosine arabinoside on poxviruses as a lysosomotropic antiviral chemotherapy. *Nature*, 1976, 264, 181–183. Trouet A, Masquelier M, Baurain R, Campaneere D: A covalent linkage between daunorubicin and proteins that is stable in serum and reversible by lysosomal hydrolases as required for a lysosomotropic drug-carrier conjugate. In vitro and in vivo studies. *Proc. Natl. Acad. Sci. USA*, 1982, 79, 626–629. Dosio F, Brusa P, Crosasso P, Arpicco S, LCattel: Preparation, characterization and properties in vitro and in vivo of a paclitaxel-albumin conjugate. *J. Cont. Rel.*, 1997, 47(3), 293–304. Yasuzawa T, Tomer K: Structural determination of the conjugate of human serum albumin with a mitomycin C derivative, KW-2149, by matrix assisted laser desorption/ionization mass spectrometry. *Bioconjugate Chem.*, 1997, 8, 391–399. Wunder A, Stehle G, Schrenk H, Hartung G, Heene D, Maier-Borst W, Sinn H: Antitumor activity of methotrexate-albumin conjugates in rats bearing a Walker-256 carcinoma. *Int. J. Cancer*, 1998, 76, 884–890). The major limitations for using a protein to conjugate a bioactive compound include the propensity for inducing immunogenicity and non-specific degradation of the protein in vivo, and denaturation and irreversible alteration of the protein during preparation of the conjugate. Other proteins such as transferrin, which binds to the tranferrin receptor and thus have the potential to undergo receptor-mediated uptake (Tanaka T, Kaneo Y, Miyashita M: Intracellular disposition and cytotoxicity of transferrin-mitomycin C conjugate in HL60 cells as a receptor-mediated drug targeting system. *Biol. Pharm. Bull.*, 1998, 21(2), 147–152) and various immuno-conjugates (Gaal D, Hudecz F: Low toxicity and high antitumour activity of daunomycin by conjugation to an immunopotential amphoteric branced polypeptide. *Eur. J. Cancer*, 1998, 34(1), 155–16. Trail P, Willner D, Hellestrom K: Site-directed delivery of anthracyclines for the treatment of cancer. *Drug Dev. Res.*, 1995, 3, 196–209. Eno-Amooquaye E, Searle F, Boden J, harma S, Burke P: Altered biodistribution of an antibody—enzyme conjugate modified with polyethylene glycol. *Br. J. Cancer*, 1996, 73, 1323–1327. Flanagan P, Duncan R, Subr V, Ulbrich K, Kopeckova P, Kopecek J: Evaluation antibody-[N-(2-hydroxypropyl) methacrylamide] copolymer conjugates as targetable drug-carriers. 2. Body distribution of anti Thy-1,2 antibody, anti-transferrin receptor antibody B3/25 and transferrin conjugates in DBA2 mice and activity of conjugates containing daunomycin against L1210 leukaemia in vivo. *J. Cont. Rel.*, 1992, 18, 25–38. Springer C, Bagshawe K, Sharma S, Searle F, Boden J, Antoniw P, Burke P, Rogers G, Sherwood R, Melton R: Ablation of human choriocarcinoma xenografts in nude mice by antibody-directed enzyme prodrug therapy (ADEPT) with three novel compounds. *Eur. J. Cancer*, 1991, 11, 1362–1366.) also have been investigated. Monodisperse molecular weight distribution is often claimed to be a significant advantage for using proteins to conjugate drugs, but this can only be useful if a single species of the protein-drug conjugate can be reproducibly prepared on adequate scale which is stable on storage. This is generally not economically or technologically possible to achieve in practice. Thus, there is a need for degradable synthetic polymers developed for biomedical application, and specifically for conjugation applications, which can address the limitations inherent in the use of natural polymers for these applications.

Synthetic polymers which have been prepared and studied that are potentially degradable include polymers derived from amino acids (e.g. poly(glutamic acid), poly[$^5$N-(2-hydroxyethyl)-L-glutamine), β-poly(2-hydroxyethyl aspartamide), poly(L-glutamic acid) and polylysine). These polymers when prepared for conjugation applications that require physiological solubility do not degrade in vivo to any extent within a time period of 10–100 hours. Additionally polymers and copolymers including pseudo-poly(amino acids) (James K, Kohn J: Pseudo-poly(amino acid)s: Examples for synthetic materials derived from natural metabolites. In: Park K, ed. Controlled Drug Delivery: Challenges and Strategies. Washington, D.C.: American Chemical Society, 1997; 389–403) and polyesters such as copolymers of polylactic and poly(glycolic acid), poly(α or β-malic acid) (Abdellaoui K, Boustta M, Vert M, Morjani H, Manfait M: Metabolite-derived artificial polymers designed for drug targeting, cell penetration and bioresorption. *Eur. J. Pharm. Sci.*, 1998, 6, 61–73. Ouchi T, Fujino A, Tanaka K, Banba T: Synthesis and antitumour activity of conjugates of poly (α-malic acid) and 5-fluorouracil bound via ester, amide or carbamoyl bonds. *J. Cont. Rel.*, 1990, 12, 143–153), and block copolymers such as PEG-lysine (Nathan A, Zalipsky S, Ertel S, Agathos S, Yarmush M, Kohn J: Copolymers of lysine and polyethylene glycol: A new family of functionalized drug carriers. *Bioconjugate Chem.*, 1993. 4, 54–62.), poly(lysine citramide) (Abdellaoui K, Boustta M, Vert M, Morjani H, Manfait M: Metabolite-derived artificial polymers designed for drug targeting, cell penetration and bioresorption. *Eur. J. Pharm. Sci.*, 1998, 6, 61–73) and amino acid-PEG derived block copolymers (Kwon G, Kataoka K: Block copolymer micelles as longcirculating drug vehicles. *Adv. Drug. Del. Rev.*, 1995, 16, 295–309. Alakhov V, Kabanov A: Block copolymeric biotransport carriers as versatile vehicles for drug delivery. *Exp. Opin. Invest. Drugs*, 1998, 7(9), 1453–1473) have also been investigated for conjugation.

The three main parts of a polymer-drug conjugate: (1) polymer, (2) linker and (3) conjugated drug all have defined biological function. Together these components produce a distinct profile of pharmacological, pharmacokinetic and physicochemical properties typical of polymer-drug conjugates. The polymer is not a mere carrier for the pharmacologically active drug. The properties of the polymer are directly responsible for defining the circulation half-life, rate of cellular uptake, minimising toxicity of potent cytotoxic drugs and imparting favourable physicochemical properties (e.g. increasing the solubility of lipophilic drugs).

Lysosomes also contain a vast array of hydrolytic enzymes including proteases, esterases, glycosidases, phosphates and nucleases. Drugs have been conjugated to polymers using conjugation linkers that degrade in the lysosome while remaining intact in the bloodstream. Since many drugs are not pharmacologically active while conjugated to a polymer, this results in drastically reduced toxicity compared to the free drug in circulation.

A wide variety of linkages have been used to covalently bind a drug to the polymeric carrier. Several examples include, amide, ester, hydrazide, urethane, carbonate, imine, hydroxyl, thioether, azo and C—C.

Following the concept of lysosomotropic drug delivery two broad classes of pendent chain linkers have emerged as the main focus of research over the last two decades. These are:

1. Peptidyl linkers designed to be stable in the bloodstream, but degradable by lysosomal enzymes and thus able to release the drug intracellularly.
2. Acid-labile, pH dependent linkers which are designed to remain stable in plasma at neutral pH (7.4), but release drug intracellularly by hydrolysis in the more acidic environment of the endosome and lysosome (pH 5.5 to 6.5).

Peptide linkers have been shown to mediate lysosomotropic drug delivery (wherein the drug preferentially accumulates in the lysosome). It has become apparent that one of the successful methods of control of the rate and location of drug release from pendent chain polymers has occurred favourably when a drug is bound to the polymer backbone via a peptidyl side-chain.

Since the discovery that peptidyl side chains in HPMA copolymers could be designed for cleavage by model enzymes such as chymotryspin, tryspin and papain recent studies have seen the systematic development of HPMA copolymer-anticancer conjugates. These contain peptidyl linkers tailored for cleavage by lysosomal proteases. Such linkers have now become more widely used in many different polymer conjugates.

Shen and Ryser (*Biochim, Biophys. Res. Commun.*, 1981, 102, 1048–1054) disclose pH-sensitive linkers of n-cis-aconityl and n-maleyl groups used to conjugate daunomycin to amino ethyl polyacrylamide and to poly(d-lysine). Hydrolysis of the cis-aconityl spacer released daunomycin from poly-(d-lysine) in the lysosomes.

Diener, et al (*Science*, 1986, 231, 148–150) have shown that daunomycin, when conjugated to a targeting antigen by a cis-aconityl spacer, remains inactive in the extracellular system, but becomes active after cleavage within the acidic lysosomal environment of a target cell.

Dilman, et al (*Cancer res.*, 1988, 48, 6097–6102) have conjugated daunorubicin to the anti-T-cell monaclonal antibody T101 using a cis-aconityl group. The pH sensitivity of the linkage was confirmed. A similar study using a monaclonal antibody conjugated to doxorubicin has been shown to suppress the growth of established tumour xenografts in nude mice (Yang and Ricefelt *Proc. Natl. Acad. Sci.*, 1988, 85, 1189–1193).

GB 2,270,920 discloses a therapeutically useful alginate-bioactive agent conjugate, wherein the alginate and bioactive agent are connected covalently via an acid labile linkage, preferably a cis-aconityl group.

An advantage of conjugating a drug via an acid-labile linker is that free drug alone can be released from the pendent chain rather than amino acid or peptide drug derivatives which can occur with peptidyl linkers.

The relatively low pH within the endosomal, and lysosomal compartments and the observation that the extracellular, interstitial environment in some tumours is also acidic, has inspired the development of pendent chain-linkers that hydrolytically degrade more quickly at pH values less then 7.4. Cis-aconityl acid and Schiff base derivatives are the two predominant types of hydrolytically labile linkers that have been explored.

One object of the present invention is to provide pH dependant degradeable polymers.

A further object of the present invention is to provide biocompatible, degradable polymers that will hydrolytically degrade at faster rates at acidic pH values than at neutral pH values.

A further object of the present invention is to provide degradable polymers that degrade in the endosome or lysosome, while enabling conjugation to a lysosomally labile bioactive agent.

SUMMARY OF THE INVENTION

One embodiment of the invention provides a polymer comprising: a polymeric backbone comprising at least one unit having the structure (I),

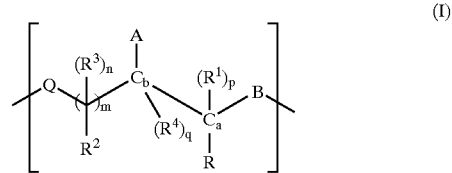

wherein R–R$^4$ comprise groups selected from the group consisting of H, $C_1$–$C_{12}$ alkyl, $C_6$–$C_{18}$ aryl, $C_7$–$C_{18}$ aralkyl, $C_6$–$C_{18}$ cycloalkyl or any of the group consisting of $C_1$–$C_{12}$ alkyl, $C_6$–$C_{18}$ aryl, $C_7$–$C_{18}$ aralkyl, $C_6$–$C_{18}$ cycloalkyl substituted, within the carbon chain or appended thereto, with one or more heteroatoms; R and R$^2$ or R and R$^4$ or R and R$^1$ or R$^2$ and R$^3$ may be joined so that with the carbon atom(s) to which they are attached they together form a saturated, partially unsaturated or unsaturated ring system respectively, may have a pendent group which may incorporate a linker unit, (for example a peptide linkage) or a unit having the structure (I); A comprises a proton donating moiety selected from the group consisting of

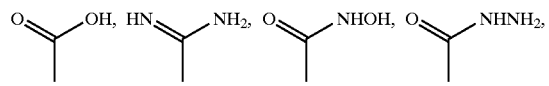

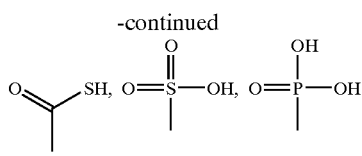

B comprises a hydrolytically labile group and is selected from the group consisting of

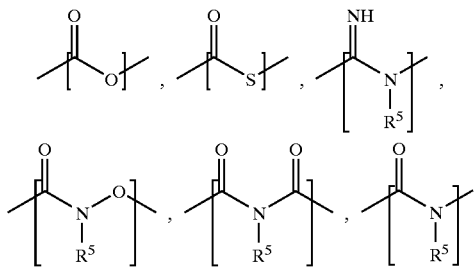

wherein each $R^5$ is individually selected from the group consisting of H, $C_1$-$C_{12}$ alkyl, $C_6$-$C_{18}$ aryl, $C_7$-$C_{18}$ aralkyl, $C_6$-$C_{18}$ cycloalkyl; wherein groups A and B are in a cis-configuration about bond $C_a$-$C_b$; m is an integer of 0 to 100, n, p and q are each an integer of 0 or 1; Q comprises 1 or more structures selected from the group consisting of

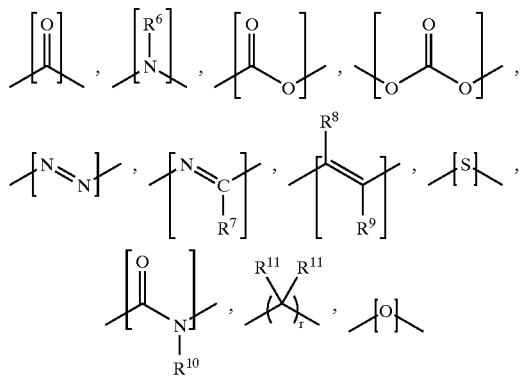

wherein $R^6$-$R^{11}$ are individually selected from the same group as defined for group R above and r is an integer between 1 and 5000, preferably 1 to 10 most preferably 1 to 6.

$C_a$-$C_b$ may be a double bond, in which case p and q are 0 and groups A and B are in a cis-configuration across the double bond. R and $R^2$ or R and $R^4$ or R and $R^1$ or $R^2$ and $R^3$, preferably R and $R^2$, may be joined to one another to form part of a $C_3$-$C_{12}$ ring system which may have none one or more than one unsaturated bond and may be aromatic. When such a ring system is formed and $C_a$-$C_b$ is not a double bond, A and B are in a cis-configuration about bond $C_a$-$C_b$. Preferably such a ring system is a $C_3$-$C_7$ ring system. The ring system may incorporate any of the groups defined for R or may include one or more Q groups.

When $C_a$-$C_b$ is a single bond, p and q are 1 and R, $R^1$, $R^4$ and A are selected from sterically bulky groups in such a way as to maintain a cis-configuration of A and B about bond $C_a$-$C_b$. Preferably $C_a$-$C_b$ is a double bond.

Preferably R-$R^4$ are individually selected from the group consisting of hydrogen, methyl, ethyl, propyl, butyl, pentyl and hexyl and isomers thereof, acyl, alkoxy and acyloxy or mixtures thereof. Most preferably R, $R^2$ and $R^3$ are hydrogen.

Preferably each $R^5$ is individually selected from the group consisting of H, methyl, ethyl, propyl, butyl, pentyl and hexyl, preferably hydrogen.

A preferably comprises a group or a protected carboxylic acid group.

B preferably comprises an amide bond, and is most preferably a group

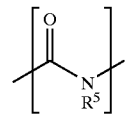

wherein $R^5$ has been hereinbefore defined.

Q may comprise more than one or a mixture of the structures defined above. Preferably Q comprises a carbonyl group, —$NR^{12}$—, —O— or —$CH_2$— group, wherein $R^{12}$ is selected from the group consisting of hydrogen, $C_{1-6}$-alkyl, preferably methyl, ethyl, propyl, butyl, pentyl and hexyl and isomers thereof. Preferably $R^{12}$ is a hydrogen atom.

Most preferably Q comprises a carbonyl functionality or a —$CH_2$— group, especially a carbonyl functionality.

In a particularly preferred embodiment bond $C_a$-$C_b$ is a double bond, R is hydrogen, $R^2$ and $R^3$ are hydrogen, n is 1, m is 1, p and q are 0, A is a carboxylic acid group, B comprises an amide bond and Q comprises an carbonyl group.

Preferably where the polymer contains more than one (I) moiety, the groups A, B, Q, R-$R^4$, m, n, p and q in each individual moiety are the same.

The other components of the polymeric backbone may be other groups having the structure (I), peptide units or other degradeable polymeric, oligomeric or monomeric units. For example, the polymeric backbone may comprise acrylic polymers, alkylene polymers, urethane polymers, amide polymers, polypeptides, polysaccharides and ester polymers. Preferably the backbone components comprise derivatised polyethyleneglycol or copolymers of hydroxyalkyl (meth)acrylamide, most preferably amine derivatised polyethyleneglycol or hydroxypropylmethacrylamide-methacrylic acid copolymers, or derivatives thereof.

A further embodiment of the present invention provides a polymer comprising a polymeric backbone comprising the structure (II)

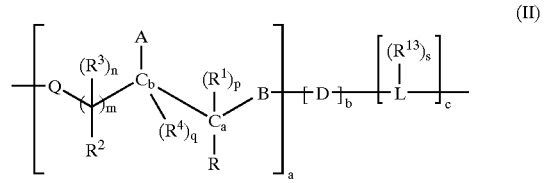

(II)

wherein A, B, Q, R-$R^4$, m, n, p and q are as defined above; L is a polymeric, oligomeric or copolymeric bridging group which comprises groups selected from the group consisting of acrylic polymers, alkylene polymers, urethane polymers, polyethylene glycols, polyamides(including polypeptides), polysaccharides and polyesters. a is an integer of 1 to 100000, b and c are integers of 0 to 100000 and s is an integer of 0 to 100; D comprises one or more structures individually selected from the group consisting of,

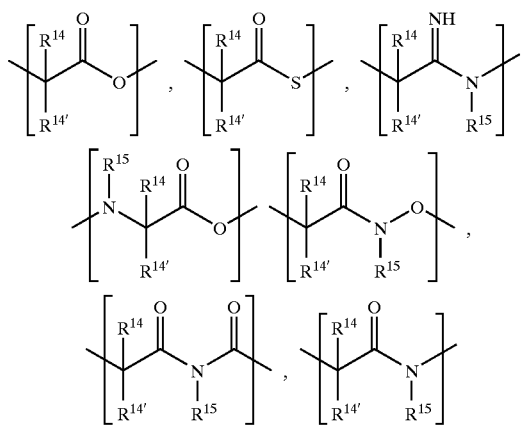

wherein $R^{14}$ and $R^{14'}$ comprise groups individually selected from the same groups as defined for R or may comprise a structure selected from the group consisting of

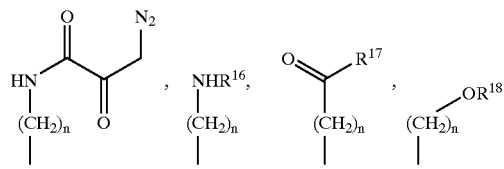

wherein n is an integer of 0–100, $R^{15}$ is selected from the group consisting of hydrogen and $C_1$–$C_6$ alkyl, $R^{16}$ to $R^{18}$ are individually selected from the group consisting of H, $C_1$–$C_{12}$ alkyl, $C_1$–$C_{12}$ alkenyl, $C_6$–$C_{18}$ aryl, $C^7$–$C_{18}$ aralkyl, $C_5$–$C_{18}$ cycloalkyl or is selected from the group consisting of $C_1$–$C_{12}$ alkyl, $C_1$–$C_{12}$ alkenyl, $C_6$–$C_{18}$ aryl, $C_7$–$C_{18}$ aralkyl, $C_6$–$C_{18}$ cycloalkyl substituted, within the carbon chain or appended thereto, with one or more heteroatoms, a pendent group comprising a linker unit, for example a peptide linkage or a unit having the structure (I) or a leaving group; $R^{13}$ is selected from the group consisting of H, $C_1$–$C_{12}$ alkyl, $C_1$–$C_{12}$ alkenyl, $C^6$–$C_{18}$ aryl, $C_7$–$C_{18}$ aralkyl, $C_5$–$C_{18}$ cycloalkyl or is selected from the group consisting of $C_1$–$C_{12}$ alkyl, $C_1$–$C_{12}$ alkenyl, $C_6$–$C_{18}$ aryl, $C_7$–$C_{18}$ aralkyl, $C_6$–$C_{18}$ cycloalkyl substituted, within the carbon chain or appended thereto, with one or more heteroatoms, $R^{13}$ may contain a linker unit, for example a peptide linkage or a unit having the structure (I).

Preferably L comprises a compound selected from the group comprising derivatised polyethyleneglycol and (hydroxyalkyl(meth)acrylamide-methacrylic acid copolymer or amide or ester derivative thereof, most preferably amine derivatised polyethyleneglycol.

Most preferably L comprises a structure comprising a group selected from the group consisting of

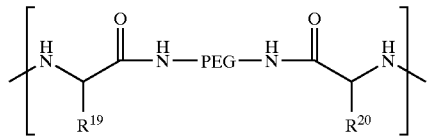

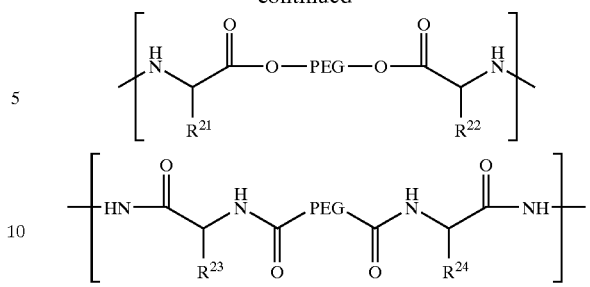

wherein PEG is polyethyleneglycol, $R^{19}$–$R^{24}$ may be a pendent group comprising a cleavable linker unit, and comprise groups individually selected from the same groups as defined for R or may comprise a structure selected from the group consisting of

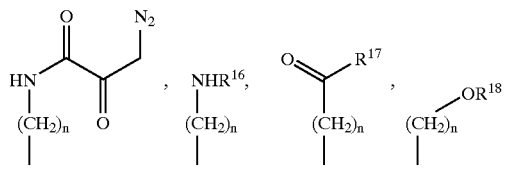

wherein n and $R^{16}$ to $R^{18}$ have been defined hereinbefore.
s is preferably an integer of 1 to 10.
Where L is a group incorporating one of groups $R^{19}$ to $R^{24}$, b is preferably 0.
Preferably at least one of $R^{14}$ to $R^{24}$ should incorporate a pendent group. Preferably such a pendent group incorporates a cleavable bond. This would be the case wherein $R^{14}$ to $R^{24}$ comprise a cleavable group (I) as hereinbefore defined, or a peptidic bond capable of being cleaved by lysosomal enzymes.

Preferably $R^{16}$–$R^{18}$ are H, tosylate, Fmoc, halogen, methyl, ethyl, propyl, butyl, pentyl or isomers thereof.

A pendent group as defined hereinbefore may incorporate a bioactive agent to form a conjugate. Preferably the bioactive agent is an anti-cancer agent, for example doxorubicin, daunomycin, taxol and the like. This permits both cleavage of the linker unit, thus releasing drug to the desired site, and biodegradation of the macromolecular carrier, thus reducing side effects associated with the difficulty of clearing such molecules from the system.

Preferably the molecular weight of L is less than 220 kDa, more preferably less than 100 kDa, most preferably less than 30 kDa. Preferably the polymer has a weight of 500D–400 kDa.

A further embodiment of the invention provides prepolymer comprising the structure (III)

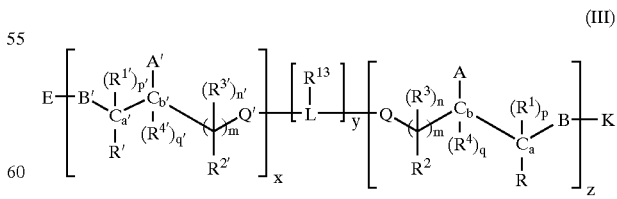

(III)

wherein A, B, Q, R–$R^4$, $R^{13}$, L, m, n, p and q are as defined herein before; A', B', Q' $R^{1'}$–$R^{4'}$, m', n', p', and q' are selected from the groups as defined for A, B, Q, $R^1$–$R^4$ m, n, p and q respectively; E and K are selected from the group consisting of hydrogen, a protecting group or an activating group and may be the same or different; z is an integer of 1 to 100, y is an integer of 0 to 10 and x is an integer of 0 to 100.

z is preferably 1, y is preferably 1 or 0, x is preferably 1 or 0. Most preferably x=z. Preferably B=B', Q=Q', A=A', $R^1$–$R^4$=$R^{1'}$–$R^{4'}$, m=m', n=n', p=p' and q=q'. Preferably when B and/or B' comprise a carboxylic acid group, E and K are an activating group selected from the group consisting of N-succinimidyl, pentachlorophenyl, pentaflourophenyl, para-nitrophenyl, dinitrophenyl, N-phthalimido, N-norbornyl, cyanomethyl, pyridyl, trichlorotriazine, 5-chloroquinolino. These groups are formed from the reaction with group B, with the following compounds N-hydroxysuccinimide, pentachlorophenyl, pentaflourophenyl, para-nitrophenyl, dinitrophenyl, N-hydroxyphthalimide, N-hydroxynorbornene, cyanomethyl, hydroxypyridine, trichlorotriazine, 5-chloro-8-hydroxy-quinoline respectively. In this embodiment, groups E and K are known as an "active esters". Preferably E and K are N-succinimidyl. There are other activating moieties that can act as an acylation reagent, such as the mixed anhydrides.

A further embodiment of the present invention provides a prepolymer comprising the structure (IV)

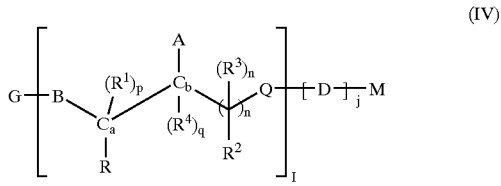

(IV)

wherein A, B, Q, R–$R^4$, D, m, n, p and q are as defined above, G and M are selected from the group consisting of hydrogen, an activating group or a protecting group and may be the same or different, i and j are integers of 1 to 10.

i is preferably 1 and j is preferably 1.

Preferably when B and/or D comprise a carboxylic acid group, G and M are an activating group as defined above. Preferably G and M are hydrogen or N-succinimidyl.

A further embodiment provides process for preparing a polymer, copolymer or prepolymer comprising reacting at least one compound having the structure (V)

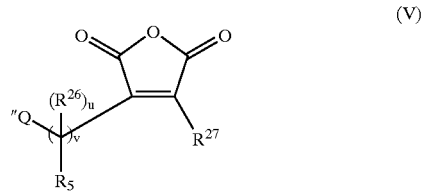

(V)

wherein $R^{25}$, $R^{26}$ and $R^{27}$ are selected from the group as defined for R; Q" is selected from the group consisting of carboxylic acid, primary or secondary amine and carbonyl; u is an integer of 0 or 1, v is an integer of 1 to 100, $R^{27}$ and $R^{25}$ may be attached to form part of a $C_3$–$C_{12}$ ring system which may have more than one unsaturated bond and may be aromatic; with at least one compound selected from the group consisting of J and $R^{13}$LNH$R^{28}$, wherein L and $R^{13}$ groups are as defined above and $R^{28}$ is selected from the same group as defined for R and may be the same or different, J is a compound having at least one primary or secondary amine and a carboxylic acid group and a pendent group incorporating a cleavable bond.

Preferably Q" is a carboxylic acid group, $R^{27}$ is hydrogen, u and v are 1, $R^{25}$ and $R^{26}$ are hydrogen or methyl. Most preferably $R^{13}$LNH$R^{28}$ comprises a NH$R^{29}$ group, wherein $R^{29}$ is individually selected from the same group as defined for $R^{28}$.

A further embodiment provides a method of selectively degrading a polymer comprising the steps of:
a) introducing a polymer as defined by structure (I) or (II) to an environment having a pH of less than 6.5,
b) cleaving said polymer.

A further embodiment provides a method for releasing a bioactive agent comprising the steps of
a) introducing a conjugate as described hereinbefore to an environment having a pH of less than 6.5,
c) cleaving the bioactive agent from the linker group by acid or enzymic hydrolysis,
d) optionally additionally cleaving the polymer by acid or enzymic hydrolysis.

The present invention also comprises compositions which comprise at least one polymer or polymer-bioactive agent conjugate and a carrier. In the case of in vivo treatment it is envisaged that the compositions may be administered orally, by injection, or topically and may comprise a pharmaceutically acceptable excipient.

A further embodiment of the invention includes the use of the novel polymer as a pharmaceutical excipient. As it degrades very quickly at low pH ranges it has application as an excipient for drug formulations prepared for oral administration (i.e. for rapid degradation in the gut or gastro intestinal tract where there are regions of very low pH).

The novel polymers of the present invention may be water soluble or insoluble depending on size and the nature of its components. The degradation products of the polymer are preferably soluble.

DETAILED DESCRIPTION OF THE INVENTION

In one embodiment, the present invention provides a polymer comprising an acid labile, pH dependent backbone incorporating a cis-aconityl group therein, more specifically a group having the structure (VI). This group is designed to remain stable in plasma at neutral pH (~7.4), but degrade intracellularly by hydrolysis in the more acidic environment of the endosome or lysosome (~pH 5.5–6.5).

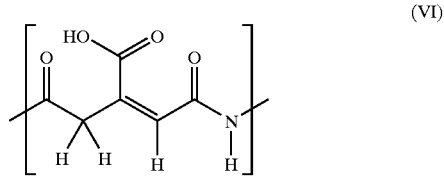

(VI)

Preferably the group (VI) is incorporated into a polymer backbone comprising a polymeric, oligomeric or copolymeric group which comprises functionalised or unfunctionalised polyethyleneglycol, ethyleneglycol copolymers, poly(hydroxyalkyl(meth)acrylamide), for instance hydroxypropylmethacrylamide-methacrylic acid copolymer (or amide or ester derivative thereof) and copolymers of styrene and maleic anhydride, polyurethanes, polyalkylenes and polyamides or amino acid residues. In a particularly preferred embodiment the polymeric backbone should incorporate a functionalised polyethyleneglycol (PEG) polymer or copolymer most preferably an amine functionalised PEG polymer.

The molecular weight of the polymer of the present invention is in the range of 30–400 kDa, while the weight of the prepolymer (III) is preferably less than about 220 kDa in order to ensure that the degraded polymer subunits are cleared from the lysosome and the kidney glomerulus. Most preferably the polymer degradation products have a molecular weight in the range of 0.5 kDa–30 kDa.

One preferred polymer of the present invention is a water soluble polyamide having the formula 3 and is made by the general reaction scheme summarised below:

gel formation. If protection is carried out as shown, compound 3 is produced. This compound (3) or compound 2 may then be reacted further with a compound $R^{13}LNHR^{28}$ as defined hereinbefore. In the diagram shown, $R^{13}LNHR^{28}$ is simply a amine-difunctionalised PEG molecule. Other compounds that are suitable for use as $R^{13}LNHR^{28}$ are

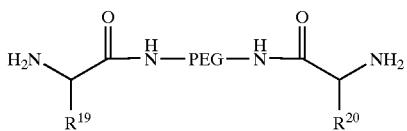

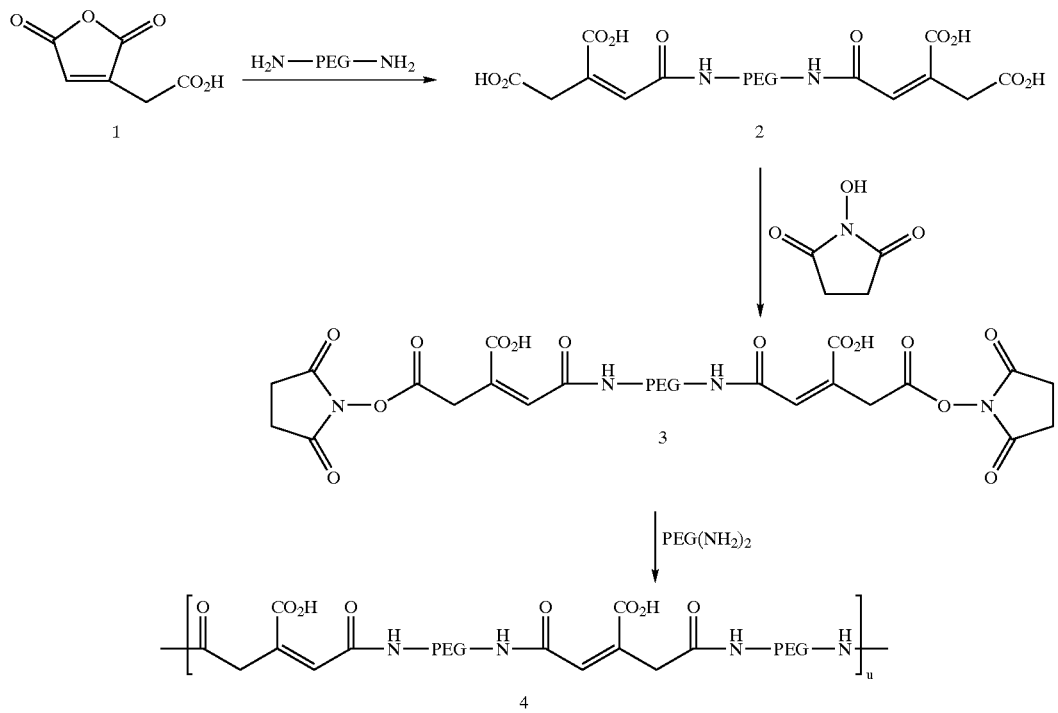

wherein PEG is a polyethylene glycol group having a molecular weight in the range 500 Da–100 kDa or derivative thereof and u is an integer in the range of 1–10000.

As shown above, the preferred polymer may be prepared by a 2 step, and optionally 3 step process. In the first step an equivalent of cis-aconitic anhydride, 1, is reacted with a compound containing two primary or secondary amine groups.

Suitable solvents include non-protic solvents including acetonitrile, dimethylformamide, dimethylsulphoxide, DMA, tetrahydrofuran, ethyl acetate, dioxane, acetone etc. Preferably acetonitrile is used. The product is isolated by a suitable method such as solvent separation and the resultant macromonomer 2 is then used as a prepolymer for the production of the acid labile polymer backbone.

Macromonomer (2) may be reacted with two equivalents of an activating group as described hereinbefore (N-hydroxysuccinimide shown) to produce an active monomer. The reason for this is that the unprotected carboxylic acid moieties would otherwise compete in the polymerization reaction, resulting in potential incomplete degradation of the polymer backbone. This situation could, however, be used in the production or enablement of cross-linking and -continued

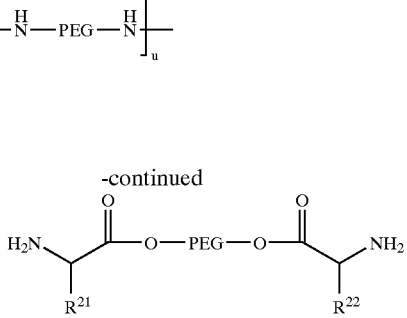

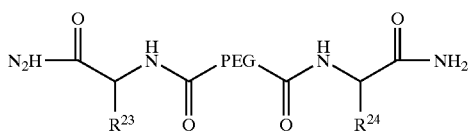

wherein $R^{19}$–$R^{24}$ have been defined hereinbefore. Preferably the above defined $R^{14}$–$R^{19}$ groups contain a group that is capable of conjugation to a drug, or a precursor thereof, for example, the group $R^{19}$–$R^{24}$ should preferably contain a primary or secondary amine.

Suitable methods of attaching a linker molecule or a drug to the polymer backbone are as follows:

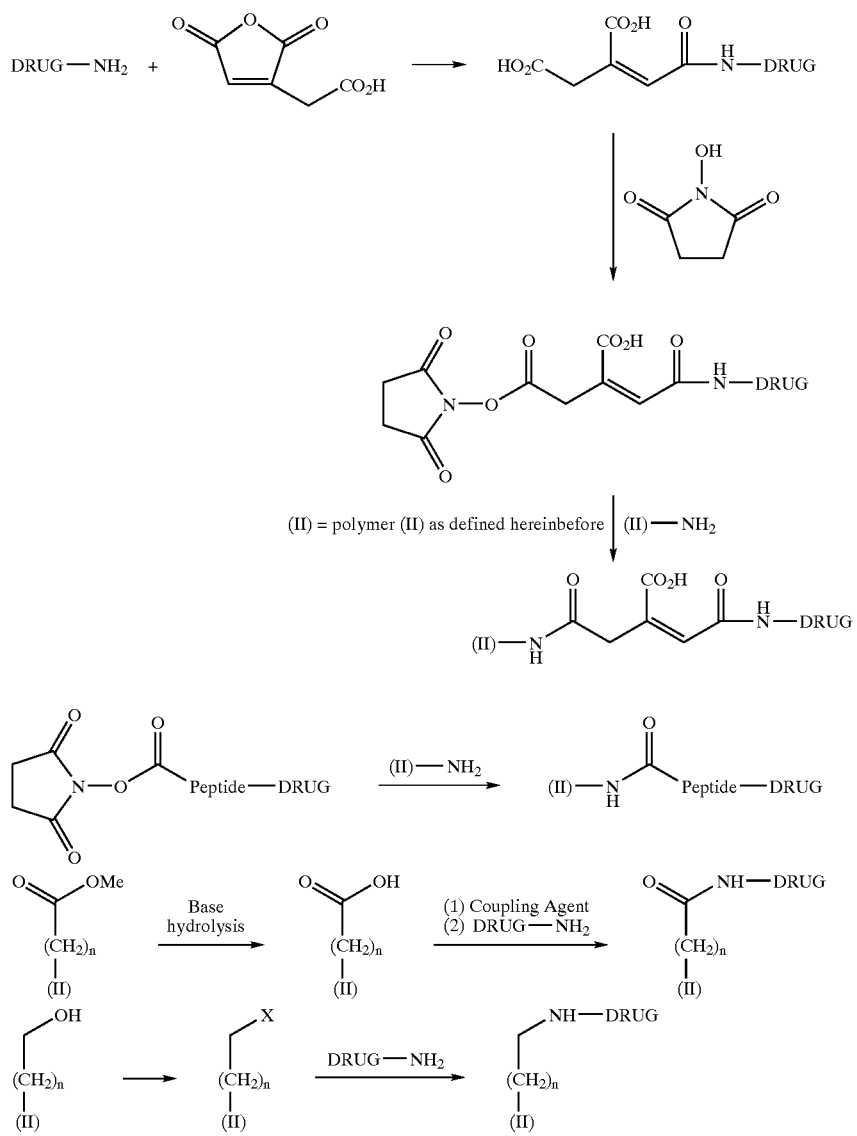

Wherein x is a leaving group such as tosylate, Br and the like.

The reaction of compound 2 or 3 results in one of the preferred polymers of the present invention, compound 4.

The conditions for the step to the final product 4 of the reaction are different than the first, and involve the use of a condensation or coupling reagent type of compound such as a carbodiimide (e.g. dicyclohexyl carbodiimide, diisopropylcarbodiimide, 1-(3-dimethylaminopropyl)-3-ethylcarbodiimide, mixed anhydride reagents (e.g. 2-ethoxy-1-ethoxycarbonyl-1-1,2-dihydroquinoline, 2-isobutoxy-1-isobutoxycarbonyl-2,2-dihydroquinoline, isobutyl chloroformate), phosphonium salts (e.g. benzotriazole-1-yl-oxy-tris-(dimethylamino)-phosphoniumhexafluorophosphate (Castro's reagent), bromo-tris-pyrrolidino-phosphonium hexafluorophospate, benzotriazole-1-yl-oxy-tris-pyrrolidino-phosphonium hexafluorophosphate), uronium salts (e.g. 2-(1H-benzotriazole-1-yl)-1,2,3,3,-tetramethyluronium hexafluorophosphate, 2-(1H-benzotriazole-1-yl)-1,1,3,3,-tetramethyluronium tetrafluoroborate) and carbonates (e.g. 1,1'-carbonyl-diimidazole, N,N'-disuccininimidyl carbonate).

The particularly preferred solvents and conditions for this reaction are that molecule 2 is allowed to react in acetonitrile (with DIPC and hydroxysuccinimide) to give the macromonomer 3. The macromonomer 3 is isolated then allowed to react in aqueous carbonate ($Na_2CO_3$) at pH 9, 24 h at ambient temperature to give the polymer such as 4.

Another particularly preferred embodiment of the present invention is the production of the water soluble polyamide having the formula 7 and is made by the general reaction scheme summarised below:

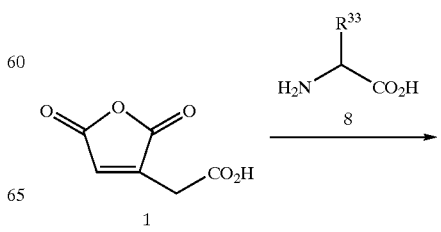

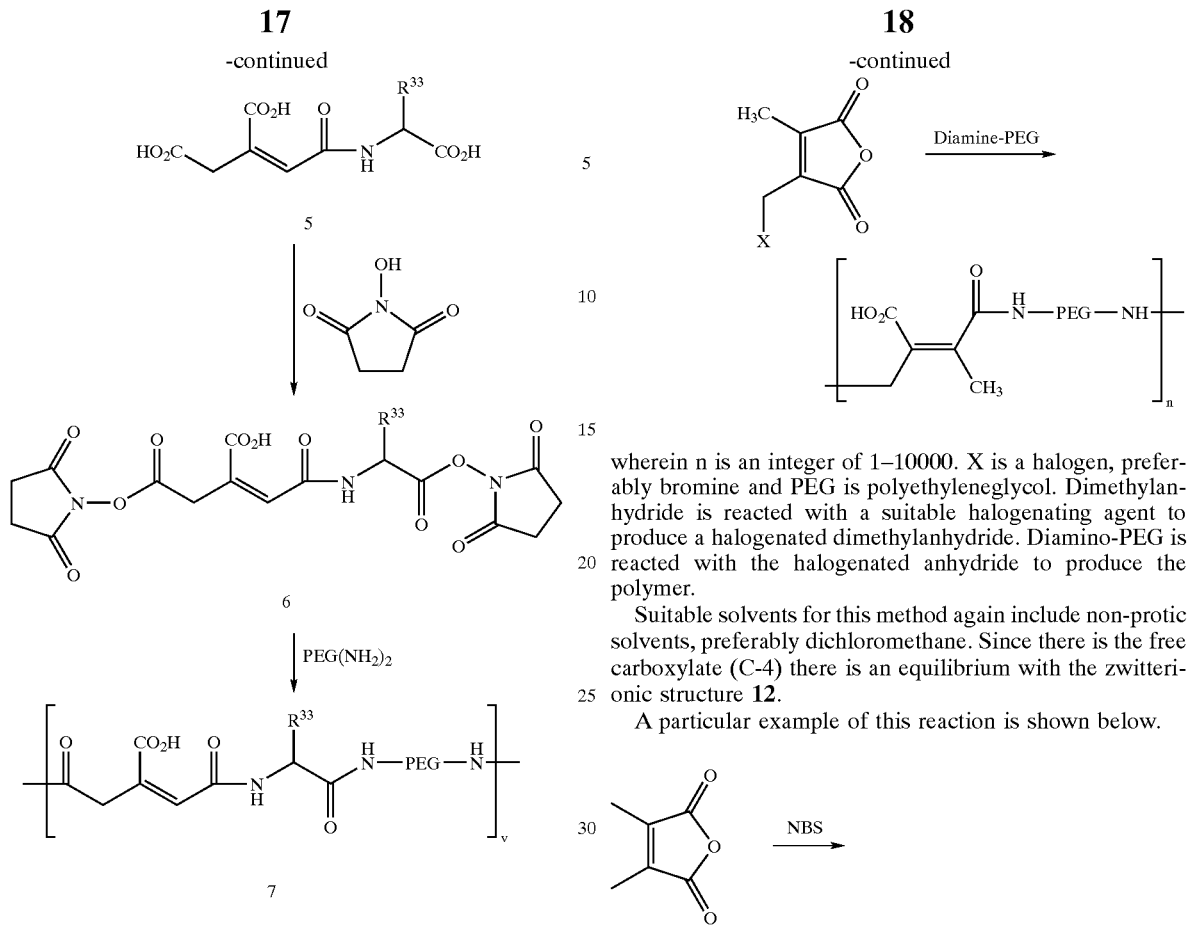

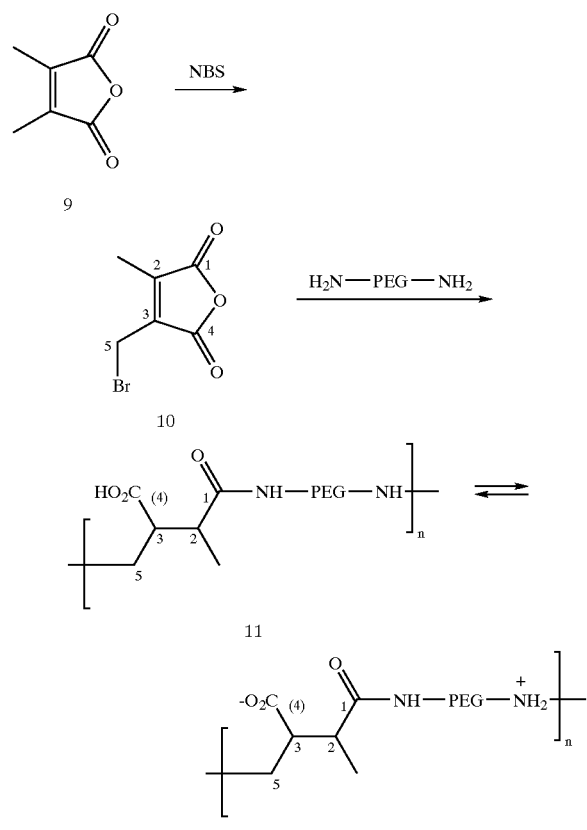

wherein PEG is a polyethylene glycol group having a molecular weight in the range 500 Da–100 kDa or derivative thereof, and v is an integer in the range of 1–10000. As with compound 4, the preferred polymer may be prepared by a 2 step, and option ally 3 step process. In the first step an equivalent of cis-aconitic anhydride, 1, is reacted with a compound containing an amine group and a carboxylic acid group (8) wherein $R^{33}$ is selected from the same group of compounds as defined for $R^{19}$–$R^{24}$.

Suitable solvents again include non-protic solvents, preferably acetonitrile. Macromonomer (2) may be reacted with two equivalents of a protecting group (N-hydroxysuccinimide shown) to produce an active monomer. If protection is carried out as shown, compound 6 is produced. This compound (6) or compound 5 may then be reacted further with a compound $R^{13}LNHR^{28}$ as defined hereinbefore. In the diagram shown, $R^{13}LNHR^{28}$ is simply a amine-difunctionalised PEG molecule. Other compounds that are envisaged for use as $R^{13}LNHR^{28}$ are as shown above.

Another embodiment of the present invention is the production of the water soluble polyamide having the formula 11 and is made by the general reaction scheme summarised below:

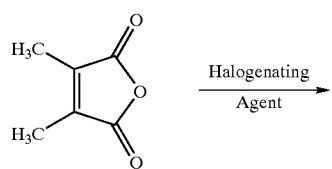

wherein n is an integer of 1–10000. X is a halogen, preferably bromine and PEG is polyethyleneglycol. Dimethylanhydride is reacted with a suitable halogenating agent to produce a halogenated dimethylanhydride. Diamino-PEG is reacted with the halogenated anhydride to produce the polymer.

Suitable solvents for this method again include non-protic solvents, preferably dichloromethane. Since there is the free carboxylate (C-4) there is an equilibrium with the zwitterionic structure 12.

A particular example of this reaction is shown below.

N-bromosuccinimide is used as the brominating agent. Since there is the free carboxylate (C-4) there is an equilibrium with the zwitterionic structure 12.

BRIEF DESCRIPTION OF THE DRAWINGS

The references in the figures to particular relates to the specific compounds exemplified in the examples below.

EXAMPLES

Figure 1:
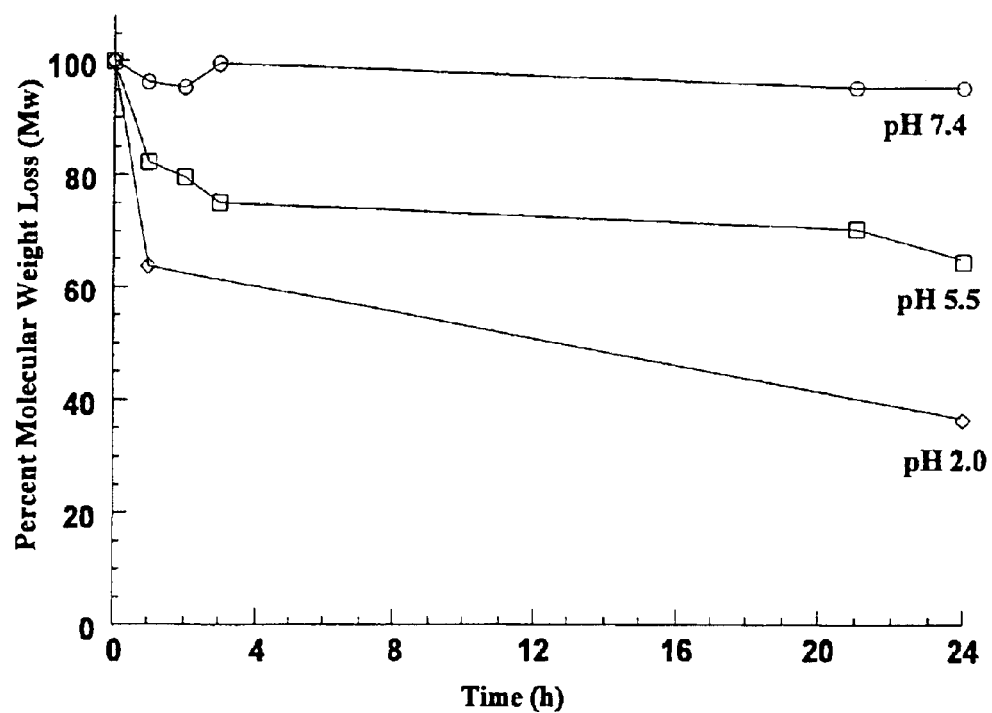
FIG. 1 shows the degradation study of the preferred polyamide 4 of the invention at pH 7.4, 5.5 and 2 in phosphate buffer at 37° C. as described in the Examples.

It should be noted that the compounds exemplified throughout the examples below are referred to with reference numerals. The same reference numerals are used to refer to the more broadly defined compounds in the description above. The more specific definitions used in the examples below is not intended to restrict the broader definitions used throughout the description above.

Example 1

Preparation of Macromonomer 2.

A 50 ml three neck round bottom flask was fitted with a condenser, thermometer and a dropping funnel. The flask was cooled using a water ice bath and $PEG_{NH2}$ 500 Jeffamine (1.6 g, 3.2 mmol, 1 eq.) and acetonitrile (5.0 ml) were added to the flask. To the dropping funnel was added cis-aconitic anhydride 1 (2.0 g, 12.8 mmol, 4.0 eq.) and acetonitrile (10 ml). Under nitrogen atmosphere, the cis-aconitic anhydride solution was slowly added over a 30 minute period to the Jeffamine solution which turned a light yellow coiour during the addition. The reaction was exothermic and the risk of possible decarboxylation was minimised by ensuring that the temperature of the reaction mixture remained in the range of 0–3° C. through out the addition of the anhydride solution. The ice water bath was the removed and the reaction mixture allowed to stir for 1 hour at ambient temperature. Diethyl ether (30 ml) was then added to the solution and the reaction mixture poured into a separatory funnel. More ether was added and the macromonomer 2 separated as an oil which settled to the bottom of the separatory funnel and was isolated. Excess solvent was first evaporated from the crude macromonomer 2 under flowing nitrogen and then the oil dried in vacuum at 40° C.

Preparation of Polyamide 4.

To a solution of macromonomer 2 (0.73 g, 0.913 mmol) and N-hydroxysuccinimide (0.21 g,1.826 mmol) in methanol (15.0 ml) at 0° C. (cooled by ice water bath) was slowly added diisopropylcarbodiimide (0.38g, 1.826 mmol). The ice bath was removed and the red coloured reaction mixture stirred at ambient temperature for 2 h. Diethyl ether was then added to the reaction mixture to oil out the activated bis-NHS ester which was collected using a separatory funnel, and dried under flowing nitrogen and in vacuum (40° C.). A quantity of the bis-NHS diester 3 (0.25 g, 0.213 mmol) was then allowed to react with Jeffamine (0.11 g, 022 mmol) in an aqueous solution (10.0 ml) of $NaCO_3$ (30.0 mg, 0.283 mmol) at ambient temperature. The reaction proceeded for 2 h while maintaining the pH at 9.0 (using $NaCO_3$). THF (5.0 ml) was added to the reaction mixture and the solution transferred to a separatory funnel where the polyamide 4 separated out as an oil which was isolated and dried using flowing nitrogen and then in vacuum (40° C.). The yield of the polyamide 4 was about 40% and was further purified by again dissolving in water and adding THF to separate as an oil (Mw=18,000 Da, PD=1.4–1.6).

Example 2

Preparation of Macromonomer 2.

$PEG_{NH2}$ 3400(5,00g, 1.47 mmol, 1 eq.) was dissolved in acetonitrile (35 ml) in a 100 ml round bottomed flask, placed in an argon atmosphere and kept cold by an ice bath. A two-fold excess of cis-aconitic anhydride (0.92 g, 5.88 mmol, 4 eq) was dissolved in acetonitrile (5 ml) under argon atmosphere. Cis-aconitic anhydride solution was slowly added into the cold solution of $PEG_{NH2}$3400 over an hour, ensuring that addition was slow enough not to cause a colour change in the reaction mixture. The reaction was left to stir in the fridge overnight. The macromonomer was precipitated from the solution with about three times the volume of chilled diethyl ether (120 ml). The precipitate was filtered with vacuum using a glass filter (porosity 3) and further dried in a dissector in vacuum for 30 minutes. The macromonomer 2 was obtained with an isolated yield of 88.1%. The IR and $^1H$ NMR data for macromonomer 2 is as follows:

FTIR (ATR): 1715 $cm^{-1}$ (s; COOH), 1636 $cm^{-1}$ (s; CO—NH), 1544 $cm^{-1}$ (s; C=C).

$^1H$ NMR ($CD_3OD$): d=3.2 (q; —$CH_2$—PEG—NH—C=O), 3.45 (s; —$CH_2$), 3.65 (large s; H—PEG), 6.5 (s; vinylic H).

Preparation of the Activated Macromonomer 3.

The macromonomer 2 (2.00g, 0.54 mmol, 1 eq) was dissolved in acetonitrile (25 ml) in a 100 ml round bottom flask, placed in an argon atmosphere and kept cold with an ice bath. A twofold excess for N-hydroxysuccinimide (NHS) (0.25 g, 2.16 mmol, 4 eq.) was dissolved in acetonitrile (2 ml) and added to the cold macromonomer solution. Diisopropyl carbodiimide (DIPC) (0.14 g, 1.08 mmol, 2 eq) was also dissolved in acetonitril (2 ml) and slowly added into the reaction solution. The reactions was stirred overnight in the fridge. More acetonitrile (25 ml) was added the next day to dissolve the Diisopropyl urea DIPC precipitate that had been formed during the reaction. The activated macromonomer 3 was then precipitated from the solution with about five times the volume of diethyl ether (250 ml) pre-chilled in an ice bath. The precipitate was filtered with vacuum using a glass filter (porosity 3) and further dried in a dissector in vacuum for 30 minutes. The activated macromonomer 3 was obtained with an isolated yield of 78.5%. The IR and $^1H$ NMR data for activated macromonomer 3 is as follows:

FTIR (ATR): 1739 $cm^{-1}$ (s; CO—O—N), 1716 $cm^{-1}$ (s; COOH), 1667 $cm^{-1}$ (s; CO—N—CO), 1638 $cm^{-1}$ (s; CO—NH), 1544 $cm^{-1}$ (s; C=C).

$^1H$ NMR ($CD_3OD$): d=2.68 (s; H—NHS), 3.2 (q; —$CH_2^{PEG}$—NH—C=O), 3.45 (s; —$CH_2$) 3.65 (large s; H—PEG), 6.5 (s; vinylic H).

Polymerisation of the Activated Macromonomer 3 and $PEG_{NH2}$3400 in Aqueous Solution.

$PEG_{NH2}$3'400 (0.7 g, 0.20 mmol) was dissolved in pH 9 sodium carbonate solution (17 ml). The resultant solution was added to the activated macromonomer 3 (0.80 g, 0.20 mmol) which had been weighted out in a 50 ml round bottom flask and placed in an ice bath. The pH of the final reaction mixture was checked with universal paper and adjusted slowly to pH 9 with sodium carbonate if necessary.

The polymerisation was allowed to take place in the fridge. Aliquots were removed periodically and analysed by SEC to observe the conversion of polymerisaton. After 25 hours, the polymer was precipitated into a chilled stirred solution of tetrahydrofuran (THF)-diethyl ether (2:3, 250 ml). The precipitate was then filtered with vacuum using a glass filter (porosity 3) and further dried in a dissector in vacuum for 30 minutes. $Mw_{SEC}$>60,000 Da (phosphate buffer solution mobile phase, PEG standards); large polydispersity. The large polydispersity indicates that in the unfractionate or crude polymer mixture there was also some unreacted prepolymer, dimers, trimers and oligimers in addition to the desired 60 kDa material that was prepared. The IR and $^1$H NMR data for the resultant polyamide 4 is as follows:

FTIR (ATR): 1701 cm$^{-1}$ (s; COOH), 1647 cm$^{-1}$ (s; CO—NH), 1540 cm$^{-1}$ (s; C=C).

$^1$H NMR (CD$_3$OD): d=3.2 (q; —CH$_2$—PEG—NH=O), 3.45 (s; —CH$_2$), 3.65 (large s; H—PEG), 6.5 (s; vinylic H).

The polymer 4 has also been prepared directly from the macromonomer 2 in organic solvent using a coupling reagent only without activating with N-hydroxysuccinimide. Polymerisation of Macromonomer 2 and $PEG_{NH2}$3400 in Organic Phase.

The macromonomer 2 (2.00 g, 0.54 mmol, 1 eq.) was dissolved in acetonitrile (25 ml) in a 100 ml round bottom flask, placed in an argon atmosphere and kept cold with an ice bath. $PEG_{NH2}$3400 (1.83 g, 0.54 mmol, 1 eq.) was dissolved in acetonitrile (25 ml) and added to the cold macromonomer solution. DIPC (0.17 ml, 1.08 mmol, 2 eq.) was then slowly added and the polymerisation was allowed to take place in the fridge. Aliquots were removed periodically and analysed by SEC to observe the conversion of polymerisation. The polymer was precipitated after 212 h with six times the volumes of ether (300 ml) pre-chilled in an ice bath. The precipitate was filtered under vacuum with glass filter (porosity 3) and further dried in a dissector under continuous vacuum for 30 minutes. Mw: . . . 7'000<50'000 Da Degradation Study.

An in vitro controlled degradation study at 5.5 and 7.4 was carried out on the polyamide 4 obtained via NHS activation. Degradation studies were performed over 7 days at 37° C. In addition, pH 2 was also used but only for 42 hours due to the rapid degradation of the polyamide. These three pH conditions were tested to demonstrate that the polyamides 4 displayed enhanced rates of degradation at acidic pH values. In particular, pH 7.4 and 5.5 were selected to simulate physiological conditions in the blood circulation and in cell lysosomes respectively. The experiment at pH 2 was selected to simulate the physiological conditions in the gastrointestinal tract.

Figure 2:
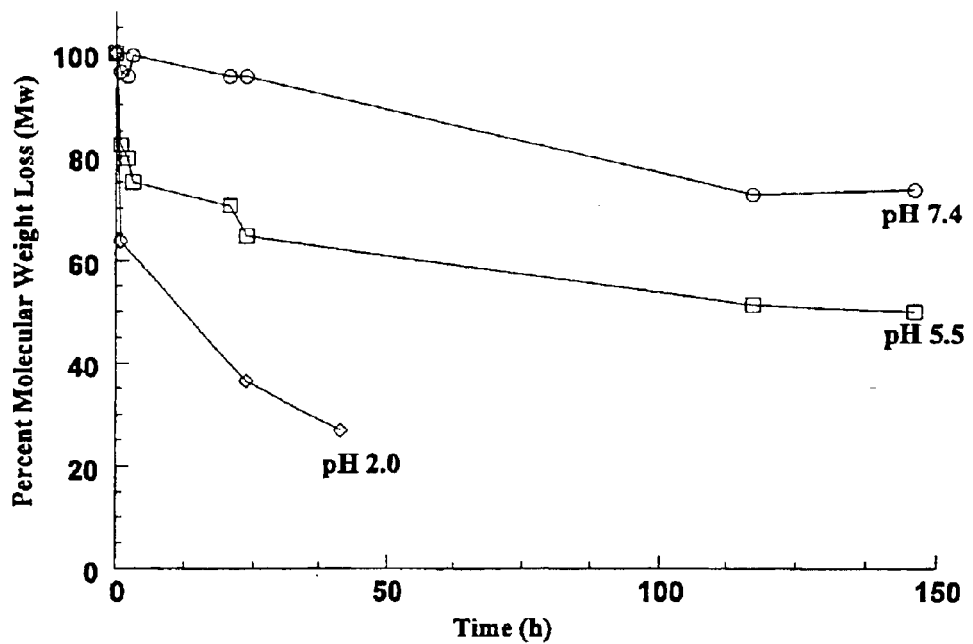
FIG. 2 shows a continued degradation profile for polyamide 4 over a 6 day period.

Polyamide 4 and its degradation products were soluble in aqueous solution so direct comparisons of GPC peak intensities at each time point were used to help monitor the extent of degradation. The degradation profile of polyamide 4 at pH 5.5 and 2.0 displayed a rapid phase during the first 2–4 hours (FIG. 1). A slower degradation phase then followed and was observed over a 6 day period (FIG. 2). The rate of this second phase was faster at pH 2.0 and was monitored for only 41 hours at pH 2.0 because the decreasing intensity of the high molecular weight GPC peak could not unambiguously be discerned from the GPC trace of lower molecular weight material still remaining in solution. Throughout the degradation study there was a concomitant increase in GPC intensities at lower molecular weights.

Figure 3:
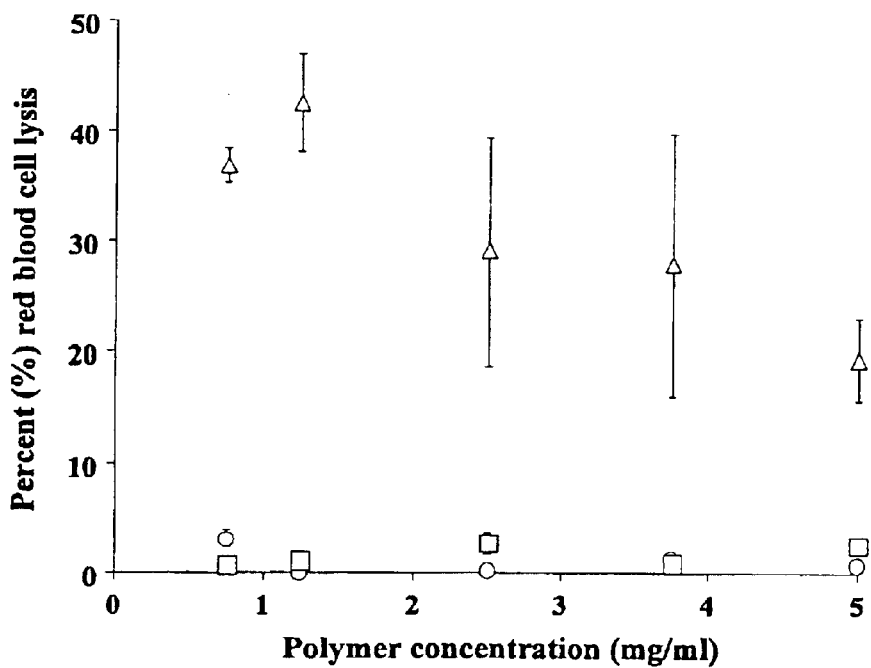
FIG. 3 shows the red blood cell lysis assay incubated for 24 h; 0, indicates polyamide 4; Δ indicates positive control, poly(ethylene imine); ☐ indicates negative control, dextran. The decrease in lysis observed with increasing concentration of poly(ethylene imine) is due to the partial precipitation of haemoglobin with this polymeric control.
Figure 4:
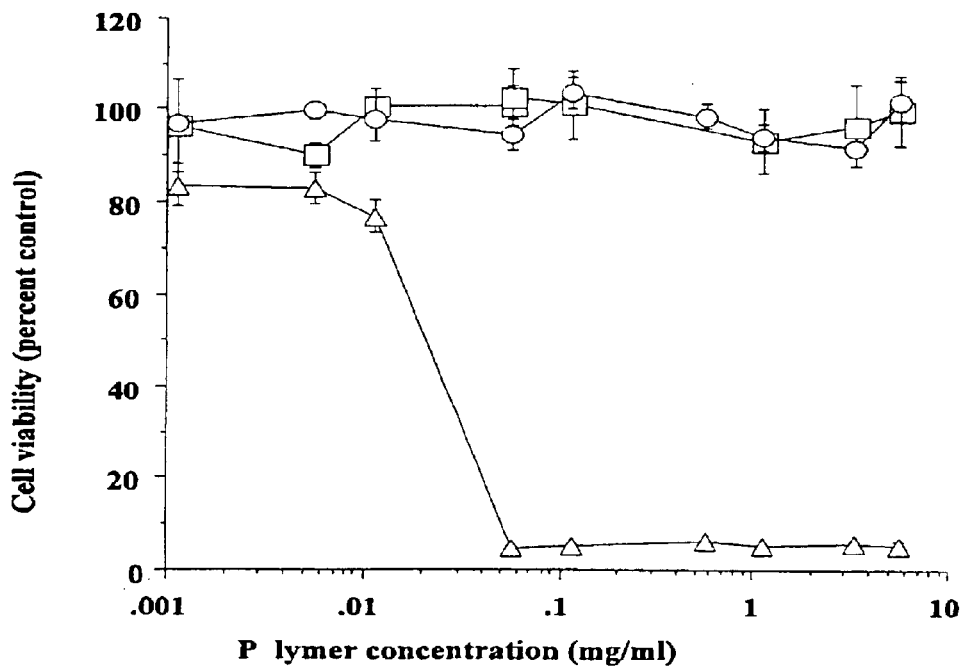
FIG. 4 shows B16 F10 cell viability (cytotoxicity) assay; 0 indicates polymer 4; Δ indicates positive control, polylysine; ☐ indicates negative control, dextran.
Figure 5:
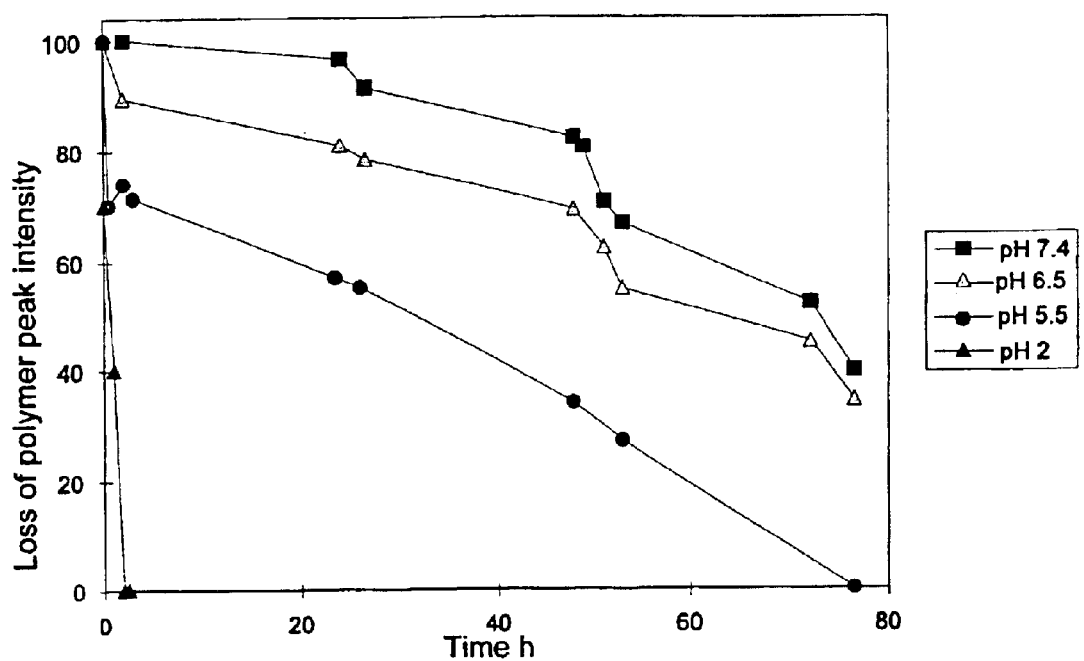
FIG. 5 shows the in vitro degradation profile for poly (amido amine) 11 at pH 7.4, 6.5. 5.5 and 2.0. The procedure used to obtain this degradation profile was the same used to obtain the degradation profile for polyamide 4.

In vitro assays indicated polyamide 4 did not lyse red blood cells (FIG. 3) nor was cytotoxic (FIG. 4).

The procedures used for the biocompatibility assays are as follows:

Cell Viability Assay. Adherent cells were seeded into separate, sterile, flat-bottomed 96 well, tissue culture treated plates at a density of 5×10$^4$ cells/well (B16 F10 cells at 1×10$^4$ cells/well). The culture was then left to incubate for 24 h in standard conditions. Prior to the end of the 24 h incubation period, the polymers to be assayed were dissolved in fresh culture medium. This was used to replace the existing media covering the cells after the designated incubation period and concentrations between 05 mg/ml were used. The cultures were then incubated using standard conditions for 67 h. During this time, 250 mg of 3-[4,5-dimethylthiazol-2-yl]-2-5-diphenyltetrazollium bromide (MTT) was dissolved in 50 ml of PBS and filter sterilised. After the 67 h incubation, 20 µl of MTT stock was added to each well giving a final concentration of 833 µg/ml of MTT in the media. The experiment was then left to incubate for a further 5 h again using standard conditions. After a further incubation period of 5 h the culture media was removed and 100 µl of optical grade DMSO was added to each well. The cultures were left for 1 h in DMSO and the plates were read at 550 nm using a microtitre plate reader. The results are shown in FIG. 4 and are expressed as viability (%) (±standard deviation (S.D.)) against polymer concentration.

Red blood cell (RBC) lysis. Fresh blood was obtained from male Wistar rats (~250 g body weight) through cardiac puncture after carbon dioxide asphyxiation, and collected in a heparin/lithium blood tube. Erythrocytes were isolated by centrifugation (Heraeus Instruments, Varifuge 3.0RS) at 1530 g for 10 minutes at 4° C. The supernatant was discarded along with the top 3–5 mm of the pellet The erythrocytes were re-suspended in pH 7.4 phosphate buffer solution (PBS) and the suspension was centrifuged as before and the supernatant was discarded. This washing process was repeated. A 2% w/v RBC suspension in PBS was then prepared. Various concentrations of the polymers in PBS were added to 96-well plates, followed by the RBC suspension. The negative control was dextran which does not cause haemolysis. The positive control was polyethylenimine (PEI) which causes RBC membranes to lyse. The polymer concentrations tested were 0.75, 1.25, 2.5, 3.75 and 5 mg/ml. The final volume in each well was 200 ml containing a 1% w/v suspension of RBC. Four wells were used for each concentration. In addition, four wells were loaded with PBS instead of polymer as a negative control. Eight wells on a separate plate were loaded with 1% v/v Triton-X 100 solution and RBC suspension to enable 100% haemoglobin release. The plates were incubated at 37° C. in a humidified environment, one set of plates for 1 h, and another set for 24 h. After the incubation period, the plates were centrifuged (1500 g, 10 min, 4° C.), and the supernatant transferred to wells on a clean plate. The UV absorbance (Titertek Multiskan Plus) of the solution in each well was measured at 550 nm to assess the degree of RBC lysis relative to Triton-X 100. The results are shown in FIG. 3.

Example 3

Synthesis of Polyamide 7.

The amino acid aconityl derivative 5 was synthesized from a reaction between cis-aconitic anhydride 1 and Glycine 8. Glycine 8 (1.299 g, 17.32 mmol) and 30 mL anhydrous acetonitrile were added to a 100 mL round bottom flask equipped with a magnetic stir bar and a pressure equilising dropping funnel. Cis-Aconitic anhydride 1 (4.322 g, 27.71 mmol) in 10 mL anhydrous acetonitrile was added via the dropping funnel and the heterogeneous reaction mixture stirred at ambient temperature for 48 h. The product 5 was filtered under vacuum with a glass filter (porosity 4), rinsed with chilled acetonitrile and dried in a dessicator in a vacuum and weighed to give an isolated yield of 91%. The product 5 and was found to be soluble in water, methanol and ethanol. The IR and $^1$H NMR data for product 5 is as follows:

FTIR (ATR): 1713, 1696 cm$^{-1}$ (s; COOH), 1634 cm$^{-1}$ (s; CO—NH), 1521 cm$^{-1}$ (s; C=C).

$^1$H NMR (D$_2$O): d=3.25 (s; CH$_2$), 3.87 (s; CH$_2$), 5.82 (s; vinylic H).

Combustion analysis: Calculated C: 41.57; H: 3.92; N: 6.06. Found C: 41.34; H: 4.04; N:5.87.

Activation of Monomer 5 to Give a Bis-active Ester Monomer 6.

Amino acid aconityl derivative 5 (0.1 g, 0.433 mmol, 1 eq) and acetonitrile (5.0 ml) were placed into a 50 mL round bottom flask equipped with a magnetic stir bar and pressure equilising dropping funnel. The solution was cooled using a dry ice bath. Into another 50 mL round bottom flask equipped with a magnetic stirr bar was added pentachlorphenol (0.69 g, 2.598 mmol, 6 eq.) in anhydrous acetonitrile (10 ml). This solution was also cooled in an ice bath. A solution of DIPC (0.109 g, 0.866 mmol, 2 eq) in acetonitrile (5.0 ml) was added to the pentachlorophenol solution and the mixture was stirred at 0° C. for 1 h. This reaction mixture was then added to the acetonitrile solution of 5 via the dropping funnel and allowed to react at dry ice temperature for 1 hour and then was placed in the refrigerator (−20° C.) and allowed to react over night. The residue in the flask was filtered with a glass filter (porosity 4) and rinsed several times with anhydrous Acetonitrile. The yellowish, amorphous solid was allowed to dry in an dessicator in vacuum for 1 h. The activated monomer 6 obtained with an isolated yield of 62%. The IR and $^1$H NMR data for activated monomer 6 is as follows:

FTIR (ATR): 1710, 1696 cm$^{-1}$ (s; COOH), 1677 cm$^{-1}$ (COOAr) 1632 cm$^{-1}$ (s; CO—NH), 1520 cm$^{-1}$ (s; C=C).

Polymerisation of Activated Monomer 6.

The activated monomer 6 (0.2 g, 0.275 mmol, 1 eq) and dichloromethane (10 ml) were added to a 50 mL round bottom flask equipped with a magnetic stir bar. The reaction mixture was cooled in an ice bath and a solution of PEG$_{NH2}$ 3'400 (0.934 g, 0.275 mmol, 1 eq) in anhydrous dichlormethane (10 ml) was slowly added to the stirred reaction mixture. Aliquots were removed periodically to follow the progress of the reaction. The polyamide 7 was precipitated with five to six times the reaction volume of diethyl ether and rinsed several times with ethylacetate. It was filtered under vacuum with a glass filter (porosity 3) and dried in a dessicator in vacuum.

Polyamide 7 was also obtained by the direct polymerisation of amino acid aconityl derivative 5.

Monomer 5 (0.5 g, 2.165 mmol, 1 eq), PEG$_{NH2}$ 3'400 and acetonitril (30 ml) were added to a 50 ml round bottom flask. A solution of DIPC (0.545 g, 4.33 mmol, 2 eq) in acetonitrile (10 ml) was added slowly and the reaction was allowed to react overnight at in a temperature of 4° C. Aliquots were removed every hour to follow the progress of the polymerisaton by GPC. The polyamide 7 was precipitated after 24 hours with 5 times the volume of diethylether. The precipitate was filtered under vacuum with a glass filter (porosity 3) and rinsed with ethylacetate before it was dried in a dessicator in vacuum.

Example 4

Preparation of Poly(amido Amine) 11.

To a solution of diamino PEG$_{3,400}$ (2 g, 5.96.10−4 mol) and dichloromethane (20 ml) in a 250 ml round bottom flask under nitrogen atmosphere was slowly added over ten minutes a solution of (bromomethyl)methyl anhydride 10 (Garman, A.; Kalindjian, S. *FEBS Lett.* 1987, 223, 361. Deshpande, A.; Natu, A.; Argade, N. *J. Org. Chem.* 1998, 63, 9557.) (0.15 g, 6.10−4 mol) in dichloromethane (1 ml). After 10 minutes, triethylenamine (64 mg, 6.3.10−4mol). After 1 day the final product was precipitated by addition of ether (150 ml), isolated as powder by filtration and then dried in vacuum. The molecular weight was >10$^6$ g/mol with a polydispersity in the range of 1.5–1.8 (aqueous GPC, PEG standards). Polymer 11 is a poly(amido amine). Since there is the free carboxylate (C-4) there is an equilibrium with the zwitterionic structure 12.

What is claimed is:

1. A polymer comprising a polymeric backbone comprising at least one unit having the structure (I),

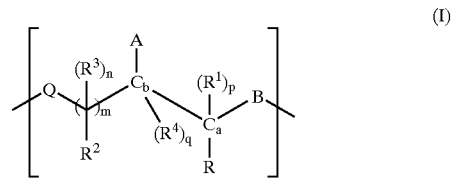

(I)

wherein each of R–R$^4$ comprise a group selected from the group consisting of H, C$_1$–C$_{12}$ alkyl, C$_6$–C$_{18}$ aryl, C$_7$–C$_{18}$ aralkyl, C$_6$–C$_{18}$ cycloalkyl or any member of said group substituted, within the carbon chain or appended thereto, with one or more heteroatoms; R and R$^2$ or R and R$^4$ or R and R$^1$ or R$^2$ and R$^3$ may be joined so that with the carbon atom(s) to which they are attached they together form a saturated, partially unsaturated or unsaturated ring system respectively, may have a pendent group which may incorporate a linker unit, A comprises a proton donating moiety selected from the group consisting of

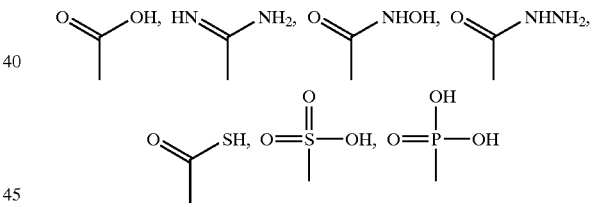

B comprises a hydrolytically labile group and is selected from the group consisting of

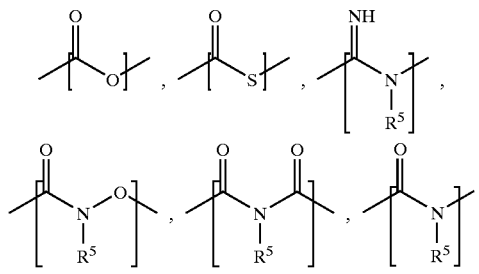

wherein each R$^5$ is individually selected from the group consisting of H, C$_1$–C$_{12}$ alkyl, C$_6$–C$_{18}$ aryl, C$_7$–C$_{18}$ aralkyl, and C$_6$–C$_{18}$ cycloalkyl; wherein groups A and B are in a cis-configuration about bond C$_a$—C$_b$; m is an integer in the range from 0 to 100, n, p and q are each 0 or 1; Q comprises 1 or more structures selected from the group consisting of

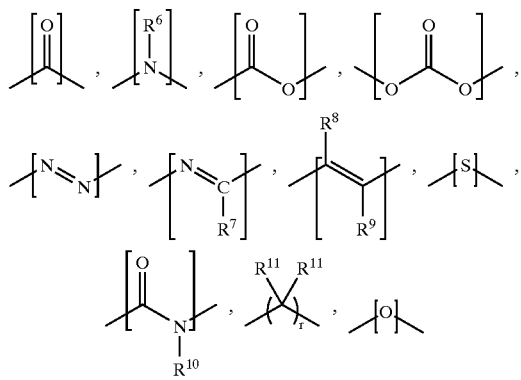

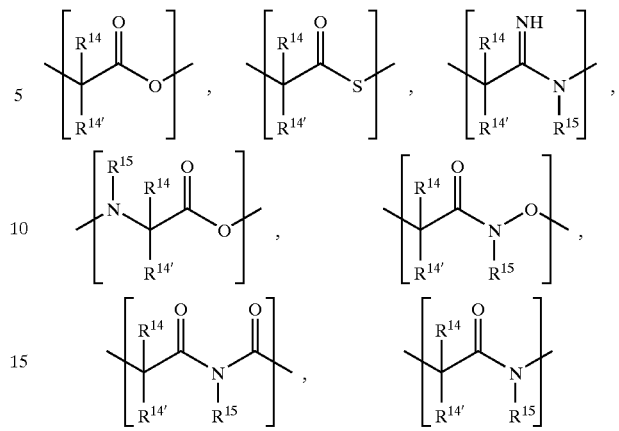

wherein $R^6$–$R^{11}$ are individually selected from the same group as defined for group R above and r is an integer between 1 and 5000, and wherein the other components of the polymeric backbone may be other groups having the structure (I), peptide units or degradable polymeric, oligomeric or monomeric units.

2. A polymer according to claim 1, wherein $C_a$—$C_b$ is a double bond and p and q are each 0.

3. A polymer according to claim 1 wherein R, $R^2$ and $R^3$ are selected from the group consisting of hydrogen, methyl, ethyl or propyl.

4. A polymer according to claim 1, wherein A is a carboxylic acid group.

5. A polymer according to claim 1, wherein B comprises an amide bond.

6. A polymer according to claim 1, wherein Q comprises a carbonyl functionality.

7. A polymer according to claim 1, wherein the polymeric backbone comprises polymers selected from the group consisting of acrylic polymers, alkylene polymers, urethane polymers, amide polymers, polysaccharides and ester polymers.

8. A polymer according to claim 1, wherein the polymeric backbone comprises a polymer selected from the group consisting of derivatised polyethyleneglycol and copolymers of hydroxyalkyl(meth)acrylamide.

9. A polymer according to claim 1, wherein the polymeric backbone comprises the structure (II)

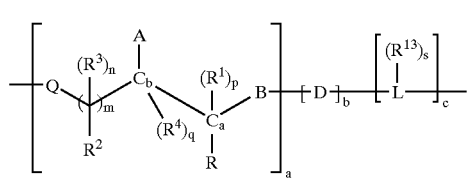

(II)

wherein A, B, Q, R–$R^4$, m, n, p and q are as defined in claim 1; L is a polymeric, oligomeric or copolymeric bridging group which comprises polymer selected from the group consisting of acrylic polymers, alkylene polymers, urethane polymers, polyethylene glycols, polyamides, polysaccharides and polyesters; a is an integer in the range of 1 to 100000, b and c are integers in the range of 0 to 100000; s is an integer in the range of 0 to 100; D comprises one or more structures individually selected from the group consisting of wherein $R^{14}$ and $R^{14'}$ comprise groups individually selected from the same groups as defined for R or may comprise a structure selected from the group consisting of

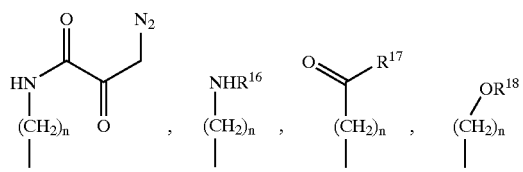

wherein n is an integer in the range of 0–100, $R^{15}$ is selected from the group consisting of hydrogen and $C_1$–$C_6$ alkyl, $R^{16}$ to $R^{18}$ are individually selected from the group consisting of H, $C_1$–$C_{12}$ alkyl, $C_1$–$C_{12}$ alkenyl, $C_6$–$C_{18}$ aryl, $C_7$–$C_{18}$ aralkyl, $C_5$–$C_{18}$ cycloalkyl or any member of said group substituted, within the carbon chain or appended thereto, with one or more heteroatoms or a pendent group comprising a linker unit, $R^{13}$ is selected from the group consisting of H, $C_1$–$C_{12}$ alkyl, $C_1$–$C_{12}$ alkenyl, $C_6$–$C_{18}$ aryl, $C_7$–$C_{18}$ aralkyl, $C_5$–$C_{18}$ cycloalkyl or any member of said group substituted, within the carbon chain or appended thereto, with one or more heteroatoms, $R^{13}$ optionally incorporating a linker unit.

10. A polymer according to claim 9, wherein L comprises amine derivatised polyethyleneglycol, 11. A polymer according to claim 9, wherein s is an integer in the range from 1 to 10.

12. A polymer according to claim 10, wherein L comprises a structure selected from the group consisting of

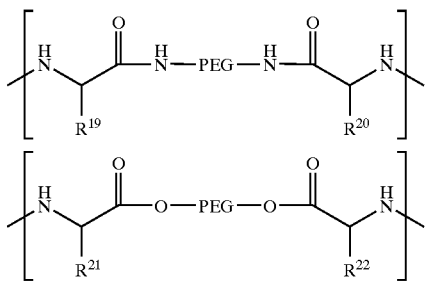

-continued

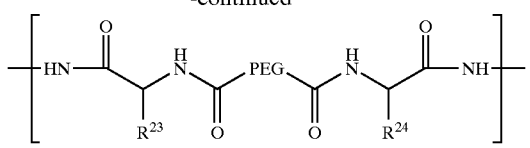

wherein PEG is polyethyleneglycol, $R^{19}$–$R^{24}$ are individually selected from the same groups as defined for R or comprise a structure selected from the group consisting of

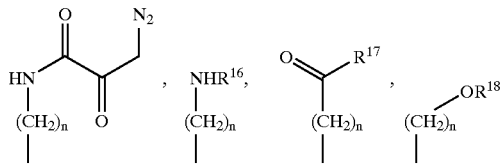

wherein n and $R^{16}$ to $R^{18}$ are as defined in claim 9, $R^{19}$–$R^{24}$ optionally incorporating a pendent group comprising a cleavable linker unit.

13. A polymer according to claim 9, wherein the polymer is conjugated to a bioactive agent.

14. A polymer according to claim 9, wherein the number average molecular weight is in the range of 0.5 kDa–400 kDa.

15. A polymer according to claim 9, having the structure

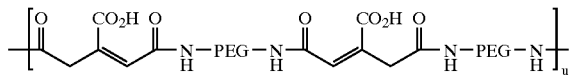

wherein PEG is a polyethylene glycol group, or derivative thereof, having a number average molecular weight in the range of 500 Da–100 kDa and u is an integer in the range of 1–10000.

16. A polymer according to claim 1, having the structure

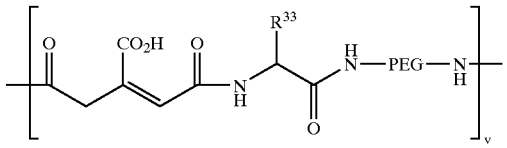

wherein PEG is a polyethylene glycol group having a number average molecular weight in the range of 500 Da–100 kDa or derivative thereof, and u is an integer in the range of 1–10000.

17. A prepolymer comprising the structure (III)

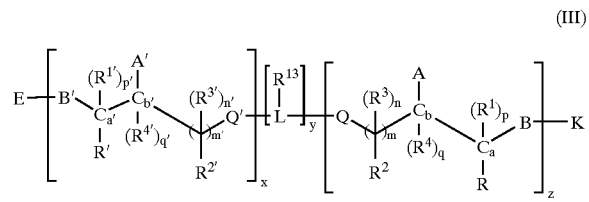

wherein A, B, Q, R–$R^3$, m, n, p and q are as defined in claim 9; $R^{13}$ and L are as defined in claim 9; A', B', Q', $R^{1'}$–$R^{4'}$, m', n', p', and q' are selected from the groups as defined for A, B, Q, $R^1$–$R^4$, m, n, p and q respectively; E and K are selected from the group consisting of hydrogen, an activating group or a protecting group and may be the same or different; z is an integer in the range from 1 to 100, y is an integer in the range from 0 to 10 and x is an integer in the range from 0 to 100.

18. A prepolymer according to claim 17, wherein z is 1, y is 1 and x is 1.

19. A prepolymer according to claim 17, wherein B and B' comprise a carboxyl group and E and K are selected from the group consisting of hydrogen, N-succinimidyl, pentachlorophenyl, pentaflourophenyl, paranitrophenyl, dinitrophenyl, N-phthalimido, N-norbornyl, cyanomethyl, pyridyl, trichlorotriazine, and 5-chloroquinoline.

20. A prepolymer comprising the structure (IV)

(IV)

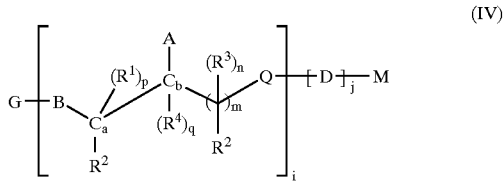

wherein A, B, Q, R–$R^4$, m, n, p and q are as defined in claim 9; D is as defined in claim 9; G and M are selected from the group consisting of hydrogen, an activating group or a protecting group, and i and j are integers in the range from 1 to 10.

21. A prepolymer according to claim 20, wherein i is 1 and j is 1.

22. A prepolymer according to claim 20, wherein B and D comprise carboxylic acid groups and G and M are selected from the group consisting of hydrogen, N-succinimidyl, pentachlorophenyl, pentaflourophenyl, para-nitrophenyl, dinitrophenyl, N-phthalimido, N-norbornyl, cyanomethyl, pyridyl, trichlorotriazine, and 5-chloroquinoline.

23. A process for preparing a polymer, copolymer or prepolymer comprising reacting at least one compound having the structure (V)

(V)

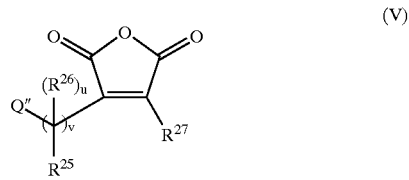

wherein $R^{25}$, $R^{26}$ and $R^{27}$ are selected from the group as defined for R; Q" is selected from the group consisting of carboxylic acid, primary or secondary amine and carbonyl; u is an integer in the range from 0 or 1, v is an integer in the range from 1 to 100, $R^{27}$ and $R^{25}$ may be attached to form part of a $C_3$–$C_{12}$ ring system which may have more than one unsaturated bond and may be aromatic; with at least one compound selected from the group consisting of J and $R^{13}LNHR^{28}$, wherein L and $R^{13}$ groups are as defined above and $R^{28}$ is selected from the same group as defined for R and may be the same or different, J is a compound having at least one primary or secondary amine and a carboxylic acid group and a pendent group incorporating a cleavable bond.

24. A method of selectively degrading a polymer comprising the steps of:
  a) introducing a polymer r a comprising a structure (I) or (II) as defined in claim 9, to a n environment having a pH of less than 6.5, and
  b) cleaving said polymer.

25. A method for releasing a bioactive agent comprising the steps of a) introducing a conjugate comprising a structure (I) or (II) as defined in claim 9, and a bioactive agent to an environment having a pH of less than 6.5, c) cleaving the bioactive agent from the linker group by acid or enzymic hydrolysis, d) optionally additionally cleaving the polymer by acid or enzymic hydrolysis.

26. A composition comprising at least one polymer as defined in claim 1 and a carrier.

27. A composition comprising at least one polymer as defined in claim 1 and a pharmaceutically acceptable excipient.

28. A polymer according to claim 12, wherein at least one of $R^{14}$ to $R^{24}$ incorporates a cleavable bond.

29. A polymer according to claim 1 wherein R, $R^2$ and $R^3$ are hydrogen.

30. A polymer according to claim 13, wherein the polymer is conjugated to an anti cancer agent.

31. A polymer according to claim 30, wherein the polymer is conjugated to doxorubicin, daunomycin or taxol.

32. A prepolymer according to claim 19, wherein E and K are selected from the group of hydrogen and N-succinimidyl.

33. A prepolymer according to claim 22, wherein E and K are selected from the group consisting of hydrogen and N-succinimidyl.

* * * * *

UNITED STATES PATENT AND TRADEMARK OFFICE
CERTIFICATE OF CORRECTION

PATENT NO. : 6,828,412 B1 Page 1 of 1
APPLICATION NO. : 10/069929
DATED : December 7, 2004
INVENTOR(S) : Stephen J. Brocchini et al.

It is certified that error appears in the above-identified patent and that said Letters Patent is hereby corrected as shown below:

Title Page, Item (73) Assignee: "School of Pharmacy, University of London", should read --Polytherics Limited,--.

Signed and Sealed this

Thirtieth Day of January, 2007

JON W. DUDAS
*Director of the United States Patent and Trademark Office*